(12) United States Patent
Shin et al.

(10) Patent No.: US 12,363,750 B2
(45) Date of Patent: Jul. 15, 2025

(54) METHOD AND DEVICE FOR ALLOCATING RESOURCE IN V2X SYSTEM

(71) Applicant: Samsung Electronics Co., Ltd., Suwon-si (KR)

(72) Inventors: Cheolkyu Shin, Suwon-si (KR); Hyunseok Ryu, Suwon-si (KR); Sungjin Park, Suwon-si (KR); Jonghyun Bang, Suwon-si (KR); Taehan Bae, Suwon-si (KR); Jeongho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 402 days.

(21) Appl. No.: 17/778,244

(22) PCT Filed: Nov. 24, 2020

(86) PCT No.: PCT/KR2020/016722
§ 371 (c)(1),
(2) Date: May 19, 2022

(87) PCT Pub. No.: WO2021/107574
PCT Pub. Date: Jun. 3, 2021

(65) Prior Publication Data
US 2023/0020105 A1     Jan. 19, 2023

(30) Foreign Application Priority Data

Nov. 25, 2019 (KR) .................. 10-2019-0152723
Feb. 11, 2020 (KR) .................. 10-2020-0016643
Apr. 14, 2020 (KR) .................. 10-2020-0045283

(51) Int. Cl.
*H04W 72/542*     (2023.01)
*H04W 4/40*     (2018.01)
(Continued)

(52) U.S. Cl.
CPC ........... *H04W 72/542* (2023.01); *H04W 4/40* (2018.02); *H04W 72/02* (2013.01); *H04W 72/1263* (2013.01); *H04W 72/543* (2023.01)

(58) Field of Classification Search
CPC ... H04L 5/0048; H04L 5/0053; H04L 5/0094; H04L 27/0006; H04W 4/40;
(Continued)

(56) References Cited

U.S. PATENT DOCUMENTS 10,536,826 B2 * 1/2020 Lee .................. H04W 72/02
10,568,115 B2 * 2/2020 Lee .................. H04W 28/26
(Continued)

FOREIGN PATENT DOCUMENTS

AU    2017248062 A1 * 4/2019 ........... H04L 1/0061
CN    107666681 A * 2/2018 ........... H04W 24/08
(Continued)

OTHER PUBLICATIONS

Vivo, Discussion on mode 2 resource allocation mechanism, R1-1908150, 3GPP TSG RAN WG1 #98, Prague, CZ, Aug. 17, 2019.
(Continued)

*Primary Examiner* — Eric Nowlin
(74) *Attorney, Agent, or Firm* — Jefferson IP Law, LLP

(57) ABSTRACT

The disclosure relates to a method and apparatus by which a transmission terminal allocates resources in a vehicle-to-everything (V2X) system. An operating method of a terminal in a wireless communication system may include identifying a first candidate resource set for sidelink communication in a first resource selection window, through sensing based on first sidelink control information (SCI) received in a first sensing window, identifying a second candidate resource set for sidelink communication in a second resource selection window, through sensing based on
(Continued)

second SCI received in a second sensing window, determining, based on the second SCI, whether to perform pre-emption or re-evaluation for a first resource, and when it is determined to perform the pre-emption or the re-evaluation for the first resource, triggering re-selection of resources for sidelink communication, and reporting the first resource for which the pre-emption or the re-evaluation has been performed, and the second candidate resource set to a higher layer of the terminal.

20 Claims, 12 Drawing Sheets

(51) Int. Cl.
  *H04W 72/02*      (2009.01)
  *H04W 72/1263*    (2023.01)
  *H04W 72/543*     (2023.01)
(58) Field of Classification Search
  CPC . H04W 72/02; H04W 72/1263; H04W 72/40; H04W 72/542; H04W 72/543
  See application file for complete search history.

(56) References Cited

U.S. PATENT DOCUMENTS

| | | | | |
|---|---|---|---|---|
| 10,667,239 | B2* | 5/2020 | Sartori | H04W 72/02 |
| 10,694,347 | B2* | 6/2020 | Lee | H04W 74/002 |
| 10,701,691 | B2* | 6/2020 | Li | H04W 24/08 |
| 10,757,550 | B2* | 8/2020 | Lee | H04W 4/40 |
| 10,785,618 | B2* | 9/2020 | Lee | H04W 74/0816 |
| 10,805,776 | B2* | 10/2020 | Lee | H04W 74/08 |
| 10,834,642 | B2* | 11/2020 | Baghel | H04W 8/005 |
| 10,993,092 | B2* | 4/2021 | Lee | H04W 72/0446 |
| 11,026,120 | B2* | 6/2021 | Khoryaev | H04L 5/0042 |
| 11,122,527 | B2* | 9/2021 | Li | H04W 72/20 |
| 11,122,620 | B2* | 9/2021 | Li | H04B 17/318 |
| 11,129,138 | B2* | 9/2021 | Li | H04L 5/0044 |
| 11,147,044 | B2* | 10/2021 | Lee | H04W 72/02 |
| 11,172,452 | B2* | 11/2021 | Chae | H04W 52/383 |
| 11,191,059 | B2* | 11/2021 | Kim | H04W 72/1263 |
| 11,246,114 | B2* | 2/2022 | Khoryaev | H04W 4/40 |
| 11,259,295 | B2* | 2/2022 | Li | H04W 28/0268 |
| 11,265,114 | B2* | 3/2022 | Yang | H04L 5/0094 |
| 11,412,480 | B2* | 8/2022 | Yasukawa | H04W 24/10 |
| 11,419,128 | B2* | 8/2022 | Wang | H04W 74/0808 |
| 11,432,130 | B2* | 8/2022 | Jung | H04W 4/12 |
| 11,483,800 | B2* | 10/2022 | Wang | H04W 72/02 |
| 11,576,157 | B2* | 2/2023 | Shilov | H04W 72/20 |
| 11,665,670 | B2* | 5/2023 | Yu | H04W 72/02 370/329 |
| 11,818,672 | B2* | 11/2023 | Khoryaev | H04W 56/001 |
| 11,849,435 | B2* | 12/2023 | Lee | H04W 74/0808 |
| 11,956,782 | B2* | 4/2024 | Shilov | H04W 72/02 |
| 12,004,122 | B2* | 6/2024 | Lee | H04W 72/20 |
| 12,047,917 | B2* | 7/2024 | Hui | H04W 74/0808 |
| 12,069,611 | B2* | 8/2024 | Lee | H04B 7/0404 |
| 2019/0090250 | A1* | 3/2019 | Lee | H04W 72/543 |
| 2019/0110177 | A1* | 4/2019 | Lee | H04W 4/40 |
| 2019/0191461 | A1* | 6/2019 | Lee | H04W 72/12 |
| 2019/0222980 | A1* | 7/2019 | Lee | H04W 72/0446 |
| 2019/0222981 | A1* | 7/2019 | Lee | H04L 1/0061 |
| 2019/0246249 | A1* | 8/2019 | Lee | H04W 72/53 |
| 2019/0313374 | A1* | 10/2019 | Lee | H04W 72/1263 |
| 2019/0313405 | A1* | 10/2019 | Li | H04W 72/542 |
| 2020/0022181 | A1* | 1/2020 | Li | H04W 24/10 |
| 2020/0029245 | A1* | 1/2020 | Khoryaev | H04W 36/22 |
| 2020/0044784 | A1* | 2/2020 | Yang | H04L 5/0053 |
| 2020/0059897 | A1* | 2/2020 | Li | H04W 74/0816 |
| 2020/0163028 | A1* | 5/2020 | Chae | H04W 52/38 |
| 2020/0221423 | A1* | 7/2020 | Wang | H04W 72/02 |
| 2020/0288433 | A1* | 9/2020 | Yu | H04W 72/0446 |
| 2020/0296690 | A1* | 9/2020 | Lee | H04W 4/40 |
| 2020/0374861 | A1* | 11/2020 | Shilov | H04W 4/46 |
| 2021/0045088 | A1* | 2/2021 | Cai | H04W 72/56 |
| 2021/0160817 | A1* | 5/2021 | Khoryaev | H04W 72/542 |
| 2021/0160819 | A1* | 5/2021 | Kim | H04W 72/1263 |
| 2021/0212026 | A1* | 7/2021 | Peng | H04W 28/0268 |
| 2021/0219268 | A1* | 7/2021 | Li | H04B 17/318 |
| 2021/0219320 | A1* | 7/2021 | Belleschi | H04W 72/20 |
| 2021/0266921 | A1* | 8/2021 | Wang | H04B 17/318 |
| 2021/0274452 | A1* | 9/2021 | Khoryaev | H04W 84/047 |
| 2021/0297841 | A1* | 9/2021 | Jung | H04W 4/12 |
| 2021/0306828 | A1* | 9/2021 | Panteleev | H04W 72/0446 |
| 2021/0314917 | A1* | 10/2021 | Lee | H04B 7/0404 |
| 2021/0314920 | A1* | 10/2021 | Li | H04W 72/56 |
| 2021/0314929 | A1* | 10/2021 | Li | H04W 28/0268 |
| 2021/0352628 | A1* | 11/2021 | Lee | H04W 76/36 |
| 2021/0352710 | A1* | 11/2021 | Lu | H04L 5/0044 |
| 2021/0400650 | A1* | 12/2021 | Shilov | H04L 5/0094 |
| 2022/0078753 | A1* | 3/2022 | Park | H04W 28/02 |
| 2022/0124562 | A1* | 4/2022 | Yu | H04W 72/20 |
| 2023/0039093 | A1* | 2/2023 | Xiang | H04W 72/0453 |
| 2023/0164874 | A1* | 5/2023 | Kim | H04W 72/40 370/252 |
| 2023/0180185 | A1* | 6/2023 | Ye | H04W 72/02 370/329 |
| 2024/0365289 | A1* | 10/2024 | Hui | H04W 28/26 |

FOREIGN PATENT DOCUMENTS

| | | | | |
|---|---|---|---|---|
| CN | 109417777 | A * | 3/2019 | H04L 1/0061 |
| CN | 109565793 | A * | 4/2019 | H04W 72/02 |
| CN | 109792640 | A * | 5/2019 | H04L 1/0061 |
| CN | 110710292 | A * | 1/2020 | H04W 72/04 |
| CN | 109565793 | B * | 9/2020 | H04W 72/02 |
| CN | 112514310 | A * | 3/2021 | H04L 1/0004 |
| CN | 110710292 | B * | 4/2021 | H04W 72/04 |
| CN | 112930657 | A * | 6/2021 | H04L 5/0053 |
| CN | 107666681 | B * | 8/2022 | H04W 24/08 |
| CN | 109792640 | B * | 4/2023 | H04L 1/0061 |
| CN | 116074897 | A * | 5/2023 | H04L 1/0061 |
| CN | 109417777 | B * | 6/2023 | H04L 1/0061 |
| CN | 117614587 | A * | 2/2024 | H04L 1/0004 |
| CN | 112514310 | B * | 7/2024 | H04L 1/0004 |
| CN | 112930657 | B * | 7/2024 | H04L 5/0053 |
| EP | 3432657 | A1 * | 1/2019 | H04W 4/40 |
| EP | 3468268 | A1 * | 4/2019 | H04L 1/0061 |
| EP | 3468272 | A1 * | 4/2019 | H04L 1/0061 |
| EP | 3512246 | A1 * | 7/2019 | H04L 1/0061 |
| EP | 3432657 | B1 * | 10/2021 | H04W 4/40 |
| EP | 3923647 | A1 * | 12/2021 | H04W 4/40 |
| EP | 3468268 | B1 * | 3/2022 | H04L 1/0061 |
| EP | 4002928 | A1 * | 5/2022 | H04L 1/0061 |
| EP | 3923647 | B1 * | 2/2023 | H04W 4/40 |
| EP | 4002928 | B1 * | 12/2023 | H04L 1/0061 |
| EP | 4304287 | A2 * | 1/2024 | H04L 1/0061 |
| EP | 3512246 | B1 * | 4/2024 | H04L 1/0061 |
| EP | 4358609 | A1 * | 4/2024 | H04W 4/40 |
| EP | 4304287 | B1 * | 8/2024 | H04L 1/0061 |
| KR | 10-2019-0050763 | A | 5/2019 | |
| TW | 202015458 | A * | 4/2020 | H04L 1/0004 |
| WO | WO-2019084816 | A1 * | 5/2019 | H04W 72/02 |
| WO | WO-2019084929 | A1 * | 5/2019 | H04W 72/04 |
| WO | WO-2020028274 | A1 * | 2/2020 | H04L 1/0004 |
| WO | WO-2020032766 | A1 * | 2/2020 | H04W 4/40 |
| WO | WO-2020092931 | A1 * | 5/2020 | H04L 5/0053 |

OTHER PUBLICATIONS

Mediatek Inc., On sidelink mode-2 resource allocation, R1-1908398, 3GPP TSG RAN WG1 Meeting #98, Prague, CZ, Aug. 17, 2019.
LG Electronics, Discussion on resource allocation for Mode 2, R1-1908902, 3GPP TSG RAN WG1 #98, Prague, CZ, Aug. 17, 2019.
Fraunhofer HHI, Fraunhofer IIS, Resource Allocation for Mode 2 NR V2X, R2-1910536, 3GPP TSG-RAN WG2 Meeting #107, Prague, Czech Republic, Aug. 15, 2019.
International Search Report and Written Opinion dated Feb. 23, 2021, issued in International Patent Application No. PCT/KR2020/016722.

(56) References Cited

OTHER PUBLICATIONS

Ericsson, Resource allocation for Mode-2 transmissions, R1-1912599, 3GPP TSG-RAN WG1 Meeting #99, Nov. 8, 2019.
Spreadtrum Communications, Discussion on resource allocation for Mode-2, R1-1902722, 3GPP TSG RAN WG1 Meeting #96, Feb. 16, 2019.
Korean Office Action dated May 30, 2025, issued in Korean Patent Application No. 10-2020-0045283.

* cited by examiner

FIG. 2
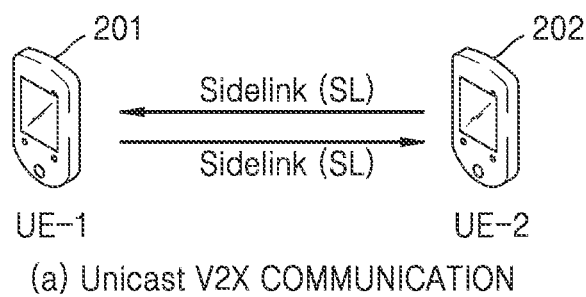
(a) Unicast V2X COMMUNICATION
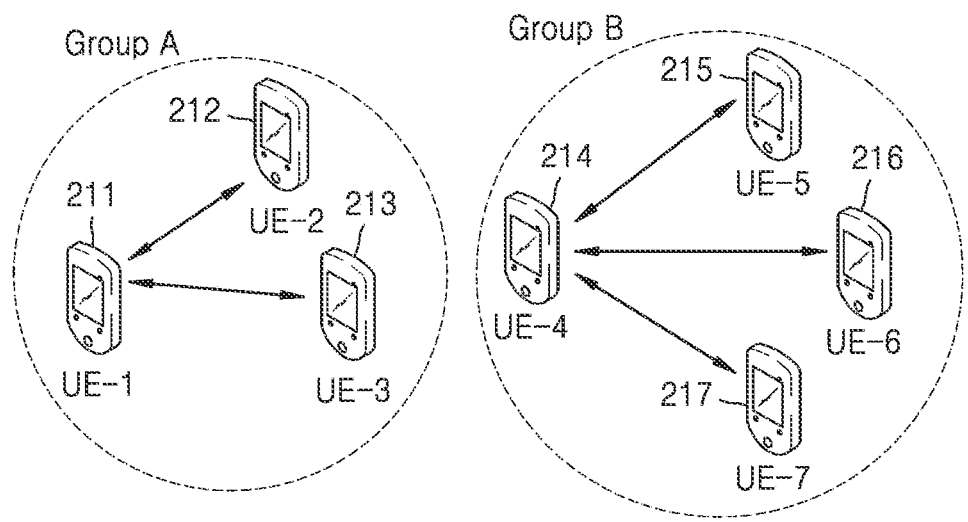
(b) Groupcast V2X COMMUNICATION FIG. 7  (a) resource (re-)selection and re-evaluation procedure
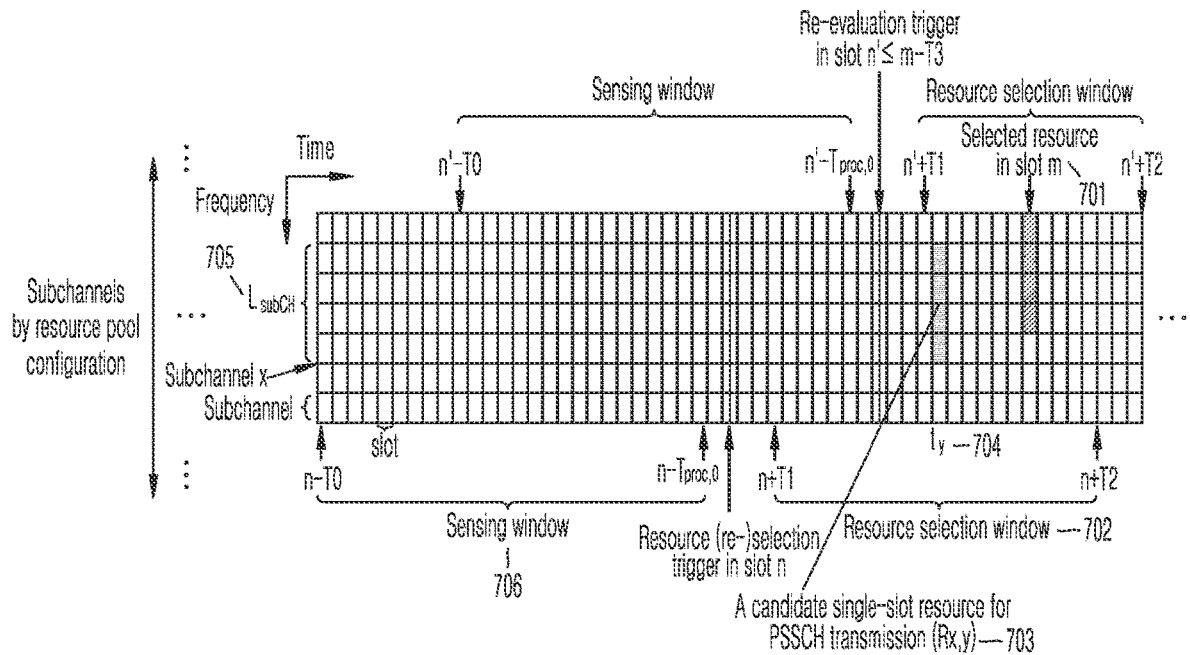
(b) pre-emption mechanism
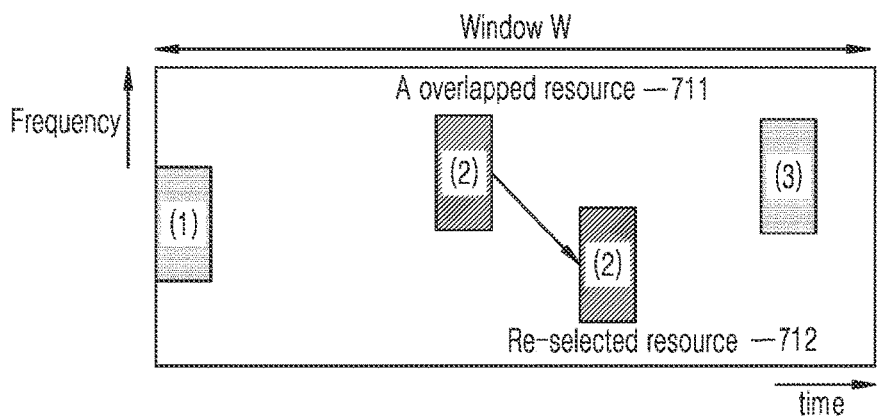
(c) Time gap between any two selected resources when HARQ feedback is enabled
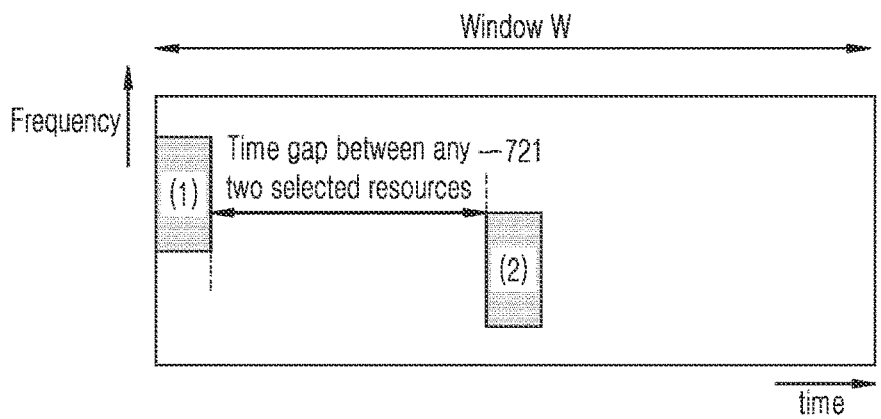

METHOD AND DEVICE FOR ALLOCATING RESOURCE IN V2X SYSTEM

TECHNICAL FIELD

The disclosure relates to a wireless communication system, and more particularly, to a method and apparatus for allocating resources in a vehicle-to-everything (V2X) system.

BACKGROUND ART

In order to meet increasing demand with respect to wireless data traffic after the commercialization of 4th generation (4G) communication systems, efforts have been made to develop 5th generation (5G) or pre-5G communication systems. For this reason, 5G or pre-5G communication systems are called beyond 4G network communication systems or post long-term evolution (post-LTE) systems. In order to achieve high data rates, the implementation of 5G communication systems in an ultra-high frequency millimeter-wave (mmWave) band (e.g., a 60-gigahertz (GHz) band) is being considered. In order to reduce pathloss of radio waves and increase a transmission distance of radio waves in an ultra-high frequency band, for 5G communication systems, various technologies such as beamforming, massive multiple-input and multiple-output (massive MIMO), full-dimension MIMO (FD-MIMO), array antennas, analog beamforming, and large-scale antennas are being studied. Also, to improve system networks for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and received-interference cancellation have been developed. In addition, for 5G systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of Everything (IoE) technology, which is a combination of IoT technology and big data processing technology through connection with a cloud server, is also emerging. In order to implement the IoT, technology elements such as sensing technology, wired/wireless communication and network infrastructures, service interface technology, and security technology are required, and thus, technologies for inter-object connection, such as sensor network, machine to machine (M2M) communication, or machine-type communication (MTC), have recently been studied. In an IoT environment, intelligent Internet technology (IT) services that collect and analyze data generated by connected objects and create new value in human life may be provided. The IoT may be applied to a variety of areas, such as smart homes, smart buildings, smart cities, smart cars or connected cars, smart grid, health care, smart home appliances, and advanced medical services through convergence and combination between existing information technologies (IT) and various industrial applications.

Accordingly, various attempts have been made to apply 5G communication systems to IoT networks. For example, technologies related to sensor networks, M2M communication, and MTC are being implemented by using 5G communication technology including beamforming, MIMO, and array antennas. The application of cloud radio access network (cloud-RAN) as the above-described big data processing technology may also be an example of convergence of 5G communication technology and IoT technology.

As various services may be provided with the development of wireless communication systems, there is a demand for a method of seamlessly providing these services.

DESCRIPTION OF EMBODIMENTS

Solution to Problem

Based on the discussions above, the disclosure provides an apparatus and method for effectively providing services in a wireless communication system.

Advantageous Effects of Disclosure

Disclosed embodiments provide an apparatus and method for efficiently allocating resources in a vehicle-to-everything (V2X) system.

BRIEF DESCRIPTION OF DRAWINGS

FIG. 2 is a diagram illustrating a vehicle-to-everything (V2X) communication method performed through a sidelink, according to an embodiment of the disclosure.

FIG. 7 is a diagram for defining a sensing window and a resource selection window required for a UE to perform (re-)selection and re-evaluation in Mode 2, according to an embodiment of the disclosure.

BEST MODE

Figure 1:
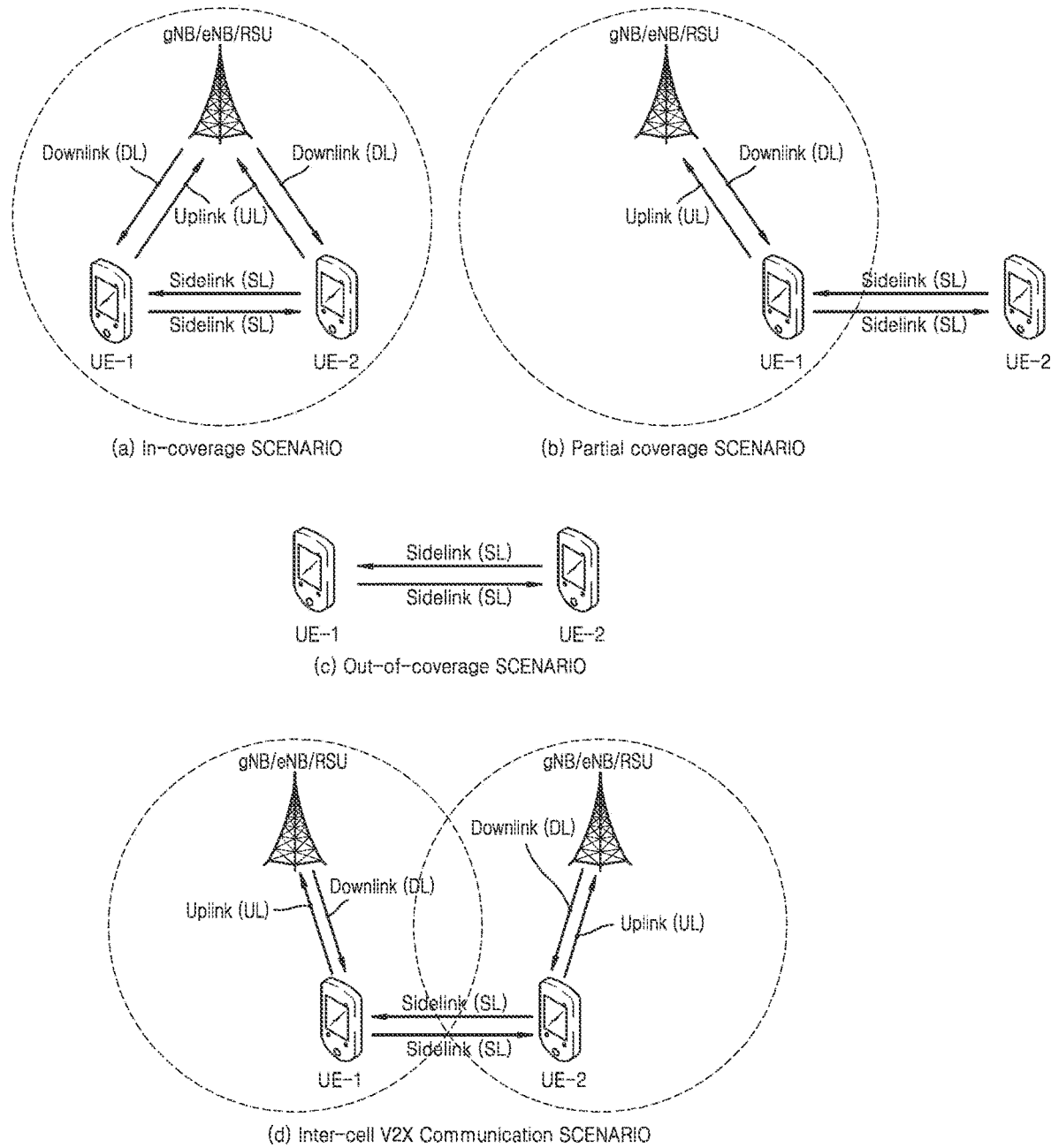
FIG. 1 is a diagram illustrating a system, according to an embodiment of the disclosure.

According to the disclosure, a method by which a transmission terminal allocates resources in a vehicle-to-everything (V2X) system may include: receiving sidelink system information from a base station; performing sensing in a resource pool, based on information about the resource pool included in the system information; selecting resources of a time-frequency domain based on the sensing; and transmitting a control signal or data to a reception terminal based on the selected resources.

According to an embodiment of the disclosure, an operating method of a terminal in a wireless communication system may include identifying a first candidate resource set for sidelink communication in a first resource selection window, through sensing based on first sidelink control information (SCI) received in a first sensing window, reporting the first candidate resource set to a higher layer of the terminal, so that the higher layer of the terminal selects a first resource in the first candidate resource set, identifying a second candidate resource set for sidelink communication in a second resource selection window, through sensing based on second SCI received in a second sensing window, determining whether to perform pre-emption or re-evaluation for the first resource, based on the second SCI, and when it is determined to perform the pre-emption or the re-evaluation for the first resource, triggering re-selection of resources for sidelink communication, and reporting the first resource for which the pre-emption or the re-evaluation has been performed, and the second candidate resource set to the higher layer of the terminal, so that the higher layer of the terminal performs re-selection of resources based on the first resource for which the pre-emption or the re-evaluation has been performed and the second candidate resource set.

According to an embodiment of the disclosure, a terminal in a wireless communication system includes a transceiver, and at least one processor configured to identify a first candidate resource set for sidelink communication in a first resource selection window, through sensing based on first sidelink control information (SCI) received in a first sensing window, report the first candidate resource set to a higher layer of the terminal, so that the higher layer of the terminal selects a first resource in the first candidate resource set, identify a second candidate resource set for sidelink communication in a second resource selectin window, through sensing based on second SCI received in a second sensing window, determine whether to perform pre-emption or re-evaluation for the first resource, based on the second SCI, and when it is determined to perform the pre-emption or the re-evaluation for the first resource, trigger re-selection of resources for sidelink communication, and report the first resource for which the pre-emption or the re-evaluation has been performed and the second candidate resource set to the higher layer of the terminal, so that the higher layer of the terminal performs re-selection of resources based on the first resource for which the pre-emption or the re-evaluation has been performed and the second candidate resource set.

Mode of Disclosure

Hereinafter, embodiments of the disclosure will be described in detail with reference to the attached drawings.

In the following description of embodiments of the disclosure, descriptions of techniques that are well known in the art and not directly related to the disclosure are omitted. This is to clearly convey the gist of the disclosure by omitting an unnecessary description.

For the same reason, some elements in the attached drawings are exaggerated, omitted, or schematically illustrated. In addition, the size of each element may not substantially reflect its actual size. In the drawings, the same or corresponding elements are denoted by the same reference numerals.

The advantages and features of the disclosure, and methods of achieving the same, will become apparent with reference to embodiments of the disclosure described below in detail in conjunction with the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. In the specification, the same reference numerals denote the same elements.

It will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing equipment, the instructions, which are executed via the processor of the computer or other programmable data processing equipment generate means for implementing the functions specified in the flowchart block(s). Because these computer program instructions may also be stored in a computer-executable or computer-readable memory that may direct the computer or other programmable data processing equipment to function in a particular manner, the instructions stored in the computer-executable or computer-readable memory may produce an article of manufacture including instruction means for performing the functions specified in the flowchart block(s). Because the computer program instructions may also be loaded onto a computer or other programmable data processing equipment, a series of operational steps may be performed on the computer or other programmable data processing equipment to produce a computer implemented process, and thus, the instructions executed on the computer or other programmable data processing equipment may provide steps for implementing the functions specified in the flowchart block(s).

Also, each block may represent a module, segment, or portion of code, which includes one or more executable instructions for implementing specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

Furthermore, the term "~unit" or "~module" used in the present embodiment refers to a software or hardware component, such as a field programmable gate array (FPGA) or an application specific integrated circuit (ASIC) which performs a certain function. However, the term "~unit" is not limited to software or hardware. A "~unit" may be configured to be in an addressable storage medium or may be configured to operate one or more processors. Thus, a "~unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and "~units" may be combined into fewer components and "~units" or may be further separated into additional components and "~units". Furthermore, components and "~units" may be implemented to operate one or more central processing units (CPUs) in a device or a secure multimedia card. Also, a "~unit" in an embodiment may include one or more processors.

Embodiments of the disclosure are described mainly based on a new radio access network (RAN) (new radio (NR)) on the $5^{th}$ generation (5G) mobile communication standard specified by the $3^{rd}$ generation partnership project (3GPP) that is a standardization organization for mobile communication standards, and a packet core (5G system, 5G core network, or next generation (NG) core) that is a core network. However, it will be obvious to one of ordinary skill in the art that the main subject matter of the disclosure is applicable to other communication systems having a similar technical background, with a slight modification within a range that is not significantly outside the scope of the disclosure.

In the 5G system, a network data collection and analysis function (NWDAF) that is a network function for providing a function of analyzing and providing data collected in a 5G network may be defined to support network automation. The NWDAF may collect/store/analyze information from the 5G network and may provide a result to an unspecified network function (NF), and an analysis result may be independently used by each NF.

Hereinafter, for convenience of explanation, some terms and names defined by the 3GPP long term evolution (LTE) standard (standard of 5G, NR, LTE, or similar system) may be used. However, the disclosure is not limited by the terms and names, and may be equally applied to systems conforming to other standards.

Also, terms for identifying access nodes, terms denoting network entities, terms denoting messages, terms denoting interfaces between network entities, terms denoting various types of identification information, etc. used herein are exemplified for convenience of explanation. Accordingly, the disclosure is not limited to the terms as herein used, and may use different terms to refer to the items having the same meaning in a technological sense.

In order to meet the increasing demand with respect to wireless data traffic after the commercialization of 4th generation (4G) communication systems, efforts have been made to develop improved 5th generation (5G) communication systems (e.g., new radio (NR) systems). In order to achieve a high data rate, 5G communication systems have been designed to operate in millimeter wave (mmW) frequency bands (e.g., 28 GHz bands). In order to reduce pathloss of radio waves and increase a transmission distance of radio waves in an millimeter wave frequency band, for 5G communication systems, technologies such as beamforming, massive multiple-input multiple-output (MIMO), full-dimension MIMO (FD-MIMO), array antennas, analog beamforming, and large scale antennas are being studied. In addition, unlike LTE, the 5G communication systems support various subcarrier spacings including 15 kHz, 30 kHz, 60 kHz, and 120 kHz unlike LTE, wherein a physical control channel uses polar coding and a physical data channel uses low density parity check (LDPC). Additionally, not only discrete Fourier transform spread orthogonal frequency division multiplexing (DFT-S-OFDM) but also cyclic prefix OFDM (CP-OFDM) are used as a waveform for uplink transmission. While LTE supports hybrid ARQ (HARQ) retransmission in units of transport blocks (TBs), 5G may additionally support HARQ retransmission based on a code block group (CBG) composed of multiple code blocks (CBs).

Also, to improve system networks for 5G communication systems, various technologies such as evolved small cells, advanced small cells, cloud radio access networks (cloud-RAN), ultra-dense networks, device-to-device communication (D2D), wireless backhaul, vehicle communication network (vehicle-to-everything (V2X)), cooperative communication, coordinated multi-points (CoMP), and received-interference cancellation have been developed.

The Internet has evolved from a human-based connection network, where humans create and consume information, to the Internet of things (IoT), where distributed elements such as objects exchange information with each other to process the information. Internet of Everything (IoE) technology, which is a combination of IoT technology and big data processing technology through connection with a cloud server, is also emerging. In order to implement the IoT, technology elements such as sensing technology, wired/wireless communication and network infrastructures, service interface technology, and security technology are required, and thus, technologies for inter-object connection, such as sensor network, machine to machine (M2M) communication, or machine-type communication (MTC), have recently been studied. In an IoT environment, intelligent Internet technology (IT) services that collect and analyze data generated by connected objects and create new value in human life may be provided. The IoT may be applied to a variety of areas, such as smart homes, smart buildings, smart cities, smart cars or connected cars, smart grid, health care, smart home appliances, and advanced medical services through convergence and combination between existing information technologies (IT) and various industrial applications.

Accordingly, various attempts have been made to apply 5G communication systems to IoT networks. For example, technologies related to sensor networks, M2M communication, and MTC are being implemented by using 5G communication technology including beamforming, MIMO, and array antennas. The application of a cloud RAN as big data processing technology may also be considered as an example of convergence of 5G technology and IoT technology. As such, a plurality of services may be provided to a user in a communication system, and a method for providing the plurality of services in the same time domain according to characteristics so as to provide the plurality of services to the user and an apparatus using the method are required. Various services provided by 5G communication systems are being studied, and one of the various services is a service that satisfies the requirements of low latency and high reliability.

In vehicle communication, an NR V2X system supports unicast communication, groupcast (or multicast) communication, and broadcast communication between user equipments (UEs). Also, unlike LTE V2X that aims at providing basic safety information transmission and reception required for driving of a vehicle, NR V2X aims at providing further advanced services such as platooning, advanced driving, extended sensor, and remote driving. Also, an NR V2X system supports a method by which a UE directly senses and allocates a sidelink transmission resource by considering both periodic and aperiodic traffic. However, in particular, for a pedestrian UE, a method and procedure of selecting transmission resources while minimizing power consumption of the UE may be required. Accordingly, UE and base station operations for solving the problem should be defined. However, there is no discussion about this. Accordingly, the disclosure provides a sensing and resource selection (allocation) method for optimizing power consumption of a UE.

An embodiment of the disclosure proposed to support the above-described scenario may particularly provide a method and apparatus for a procedure (Mode 2) by which a UE performs sensing and resource selection in a sidelink. Also, an embodiment of the disclosure proposes a Mode 2 method for minimizing power consumption of a UE.

The disclosure relates to a wireless mobile communication system, and more particularly, to a method and apparatus in which a vehicle UE supporting vehicle communication (vehicle-to-everything (V2X)) performs sensing and resource allocation or resource selection in a process of transmitting and receiving information by using a sidelink with another vehicle UE and a pedestrian UE.

The disclosure relates to a wireless communication system, and relates to a method and apparatus in which a vehicle UE supporting V2X selects transmission resources in a process of transmitting and receiving information by using a sidelink with another vehicle UE and a pedestrian UE. In detail, the disclosure relates to, when a UE directly allocates sidelink transmission resources through sensing, a resource selection criterion and base station and UE operations.

The disclosure is to propose a procedure (Mode 2) by which a UE performs sensing and resource selection in sidelink communication. Accordingly, the performance of resource selection (resource allocation) may be improved. Also, the disclosure may propose a method of performing sensing and resource selection while minimizing power consumption of a UE, and selected resources may be effectively used to optimize power consumption of the UE.

FIG. 1 is a diagram illustrating a system, according to an embodiment of the disclosure.

Referring to FIG. 1, (a) of FIG. 1 illustrates an example where all V2X UEs, i.e., UE-1 and UE-2, are located within coverage of a base station (in-coverage (IC)). All V2X UEs may receive data and control information from the base station via a downlink (DL) or transmit data and control information to the base station via an uplink (UL). Here, the data and control information may be data and control information for V2X communication. Alternatively, the data and control information may be data and control information for general cellular communication. Also, the V2X UEs may transmit/receive data and control information for V2X communication via a sidelink (SL).

Referring to FIG. 1, (b) of FIG. 1 illustrates an example where UE-1 among V2X UEs is located within coverage of a base station and UE-2 is located outside the coverage of the base station. That is, the example of (b) of FIG. 1 may be related to partial coverage where UE-2 is located outside the coverage of the base station. UE-1 located within the coverage of the base station may receive data and control information from the base station via a DL or transmit data and control information to the base station via an UL. UE-2 located outside the coverage of the base station is unable to receive data and control information from the base station via a DL and is unable to transmit data and control information to the base station via an UL. Accordingly, UE-2 and UE-1 may transmit/receive data and control information for V2X communication via an SL.

Referring to FIG. 1, (c) of FIG. 1 illustrates an example where all V2X UEs are located outside coverage of a base station (out-of coverage (OOC)). Thus, UE-1 and UE-2 are unable to receive data and control information from the base station via a DL and unable to transmit data and control information to the base station via an UL. UE-1 and UE-2 may transmit/receive data and control information for V2X communication via an SL.

Referring to FIG. 1, (d) of FIG. 1 illustrates an example of a scenario where V2X communication is performed between UEs (e.g., UE-1 and UE-2) located in different cells. In particular, in (d) of FIG. 1, V2X UEs (e.g., UE-1 and UE-2) access (RRC connected state) or are camped on (RRC disconnected state, i.e., RRC idle state) different base stations. Here, UE-1 may be a V2X transmission UE and UE-2 may be a V2X reception UE. Alternatively, UE-1 may be the V2X reception UE and UE-2 may be the V2X transmission UE. UE-1 may receive a system information block (SIB) from a base station which UE-1 accesses (or is camped on), and UE-2 may receive a SIB from another base station which UE-2 accesses (or is camped on). In this case, an existing SIB may be used as the SIB, or an SIB separately defined for V2X may be used as the SIB. Also, information of the SIB received by UE-1 and information of the SIB received by UE-2 may be different from each other. Accordingly, in order to perform V2X communication between UE-1 and UE-2 located in different cells, information should be unified, or a method of signaling information thereof and interpreting SIB information transmitted from a different cell may be additionally required.

Although a V2X system including two V2X UEs (UE-1 and UE-2) is illustrated for convenience of explanation in FIG. 1, the disclosure is not limited thereto and communication may be performed between more V2X UEs. Also, an interface (an UL and a DL) between the base station and V2X UEs may be referred to as a Uu interface and an SL between the V2X UEs may be referred to as a PC5 interface. Accordingly, these terms may be interchangeably used. In the disclosure, a UE may denote a vehicle supporting vehicle-to-vehicle (V2V) communication, a vehicle or handset (or smart phone) of a pedestrian supporting vehicle-to-pedestrian (V2P) communication, a vehicle supporting vehicle-to-network (V2N) communication, or a vehicle supporting vehicle-to-infrastructure (V21) communication. Also, in the disclosure, a UE may denote a road side unit (RSU) with a UE function, an RSU with a base station function, or an RSU with a part of a base station function and a part of a UE function.

Also, according to an embodiment of the disclosure, a base station may be a base station supporting both V2X communication and general cellular communication or a base station supporting only V2X communication. In this case, the base station may be a 5G base station (gNB), a 4G base station (eNB), or an RSU. Accordingly, in the disclosure, the base station may be referred to as an RSU.

FIG. 2 is a diagram illustrating a V2X communication method performed via an SL, according to an embodiment of the disclosure.

Referring to (a) of FIG. 2, UE-1 201 (e.g., transmission (TX) UE) and UE-2 202 (e.g., reception (RX) UE) may perform communication in a one-to-one manner, which may be referred to as unicast communication.

Referring to (b) of FIG. 2, a TX UE and an RX UE may perform one-to-many communication, which may be referred to as groupcast or multicast communication. In (b) of FIG. 2, UE-1 211, UE-2 212, and UE-3 213 form one group, i.e., group A, to perform groupcast communication and UE-4 214, UE-5 215, UE-6 216, and UE-7 217 form another group, i.e., group B, to perform groupcast communication. Each UE may perform groupcast communication only within a group to which it belongs, and may perform communication with a UE present in a different group by using unicast, groupcast, or broadcast. Although two groups (group A and group B) are formed in (b) of FIG. 21, the disclosure is not limited thereto.

Although not shown in FIG. 2, V2X UEs may perform broadcast communication. The broadcast communication may indicate that all V2X UEs receive data and control information transmitted by a V2X transmission UE via an SL. For example, in (b) of FIG. 2, when UE-1 211 is a transmission UE for broadcast communication, all UEs (UE-2 212, UE-3 213, UE-4 214, UE-5 215, UE-6-216, and UE-7 217) may receive data and control information transmitted by UE-1.

Unlike LTE V2X, NR V2X may consider support for a transmission type in which a vehicle UE transmits data only to a specific UE via unicast, and a transmission type in which a vehicle UE transmits data to a plurality of specific UEs via groupcast. For example, in a service scenario such as platooning that is a technology of grouping and moving two or more vehicles in a form of a group by connecting the two or more vehicles via one network, such unicast and groupcast technologies may be useful. In particular, unicast communication may be required for a leader UE of a group connected via platooning to control one specific UE, and groupcast communication may be required for the leader UE to simultaneously control groups including a plurality of specific UEs.

Figure 3:
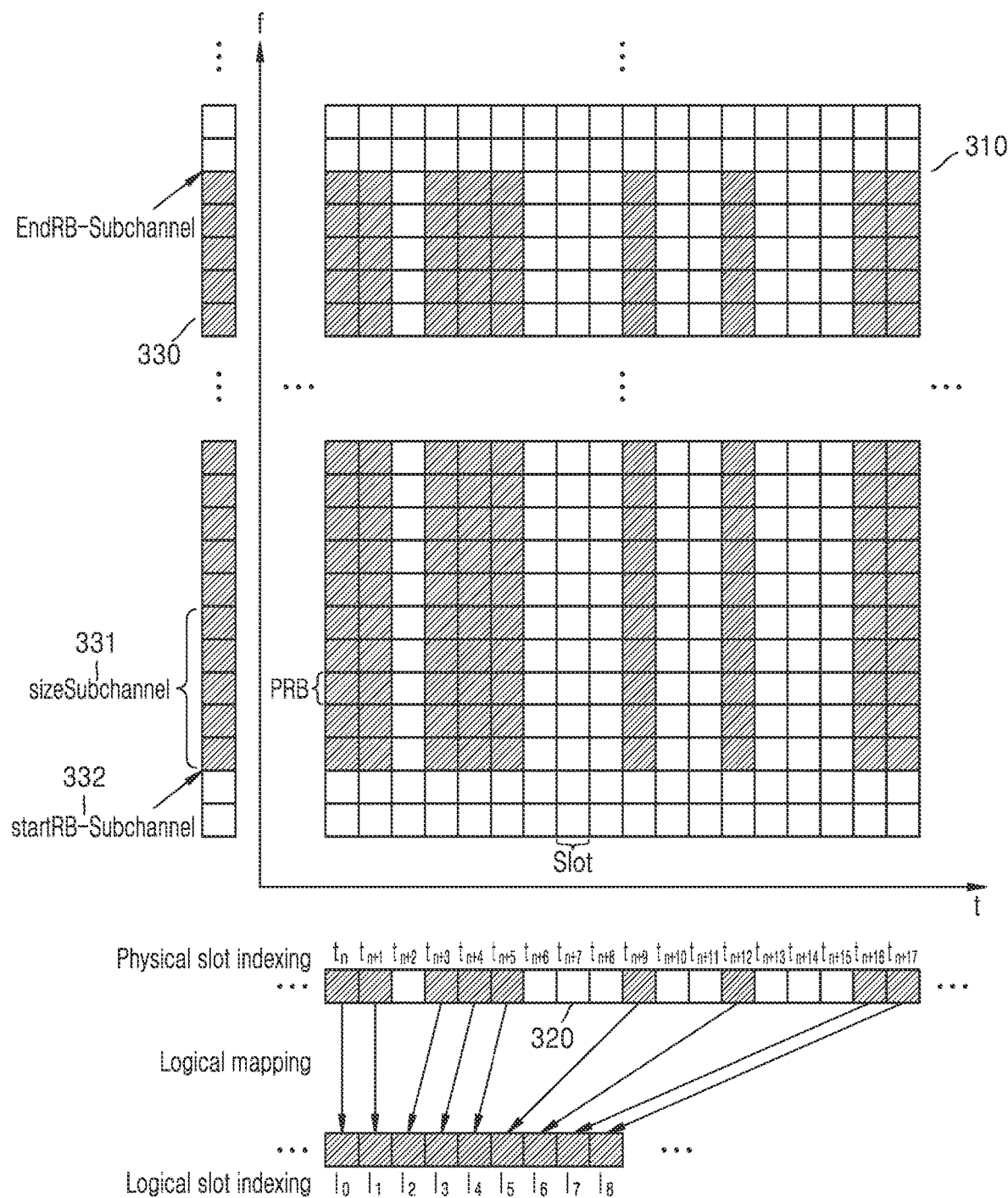
FIG. 3 is a diagram illustrating a resource pool defined as a set of resources in time and frequency domain used for sidelink transmission and reception, according to an embodiment of the disclosure.

FIG. 3 is a diagram illustrating a resource pool defined as a set of resources in time and frequency domain used for sidelink transmission and reception, according to an embodiment of the disclosure.

In a resource pool, a resource allocation unit (resource granularity) of a time axis may be a slot. Also, a resource allocation unit of a frequency axis may be a sub-channel including one or more physical resource blocks (PRBs).

Referring to FIG. 3, when a resource pool is allocated in time and frequency (310) domain, a colored region may indicate a region configured as a resource pool in time and frequency domain. Although a resource pool is non-continuously allocated in time in the disclosure, this is merely an example, and a resource pool may be continuously allocated in time. Also, although a resource pool is continuously allocated in frequency domain in the disclosure, this is merely an example, and a method of non-continuously allocating a resource pool in frequency domain is not excluded.

Referring to FIG. 3, a resource pool is non-continuously allocated in time (320). Referring to FIG. 3, a resource allocation unit (granularity) in time is a slot. In detail, one slot including a plurality of OFDM symbols may be a basic resource allocation unit of a time axis. In this case, all of the OFDM symbols constituting the slot may be used for sidelink transmission, or some OFDM symbols of the slot may be used for sidelink transmission. For example, some slots may be used for a downlink/sidelink used as a Uu interface between a base station and a UE. Referring to FIG. 3, a colored slot may indicate a slot included in a resource pool in time, and a slot allocated to the resource pool may be (pre-)configured as resource pool information in time. For example, the resource pool information in time may be indicated by a bitmap through an SIB.

Referring to FIG. 3, a physical slot 320 belonging to a non-continuous resource pool in time may be mapped to a logical slot 321. In general, a set of slots belonging to a physical sidelink shared channel (PSSCH) resource pool may be represented as $(t_0, t_1, \ldots t_i, \ldots, t_{Tmax})$.

Referring to FIG. 3, a resource pool is continuously allocated in frequency (330) domain.

A resource allocation unit in frequency domain may be a sub-channel 331. The sub-channel 331 may be defined as a resource allocation unit in frequency domain including one or more RBs. That is, the sub-channel 331 may be defined as an integer multiple of RB. Referring to FIG. 3, the sub-channel 331 may include 5 consecutive PRBs, and a sub-channel size (sizeSubchannel) may be a size of 5 consecutive PRBs. However, this is merely an example, and a sub-channel size may be differently configured, and although a sub-channel generally includes consecutive PRBs, a sub-channel does not necessarily include consecutive PRBs. The sub-channel 331 may be a basic unit of PSSCH resource allocation.

startRB-Subchannel 332 may indicate a start position of the sub-channel 331 in frequency domain in the resource pool. When resource allocation is performed in units of sub-channels 331 along a frequency axis, resources in frequency domain may be allocated through configuration information about a RB index (startRB-Subchannel 332) where which the sub-channel 331 starts, information (sizeSubchannel) indicating how many RBs are included in the sub-channel 331, and the total number (numSubchannel) of sub-channels 331. In this case, information about startRB-Subchannel, sizeSubchannel, and numSubchannel may be (pre-)configured as resource pool information in frequency domain. For example, frequency resource pool information may be configured and indicated through an SIB.

Figure 4:
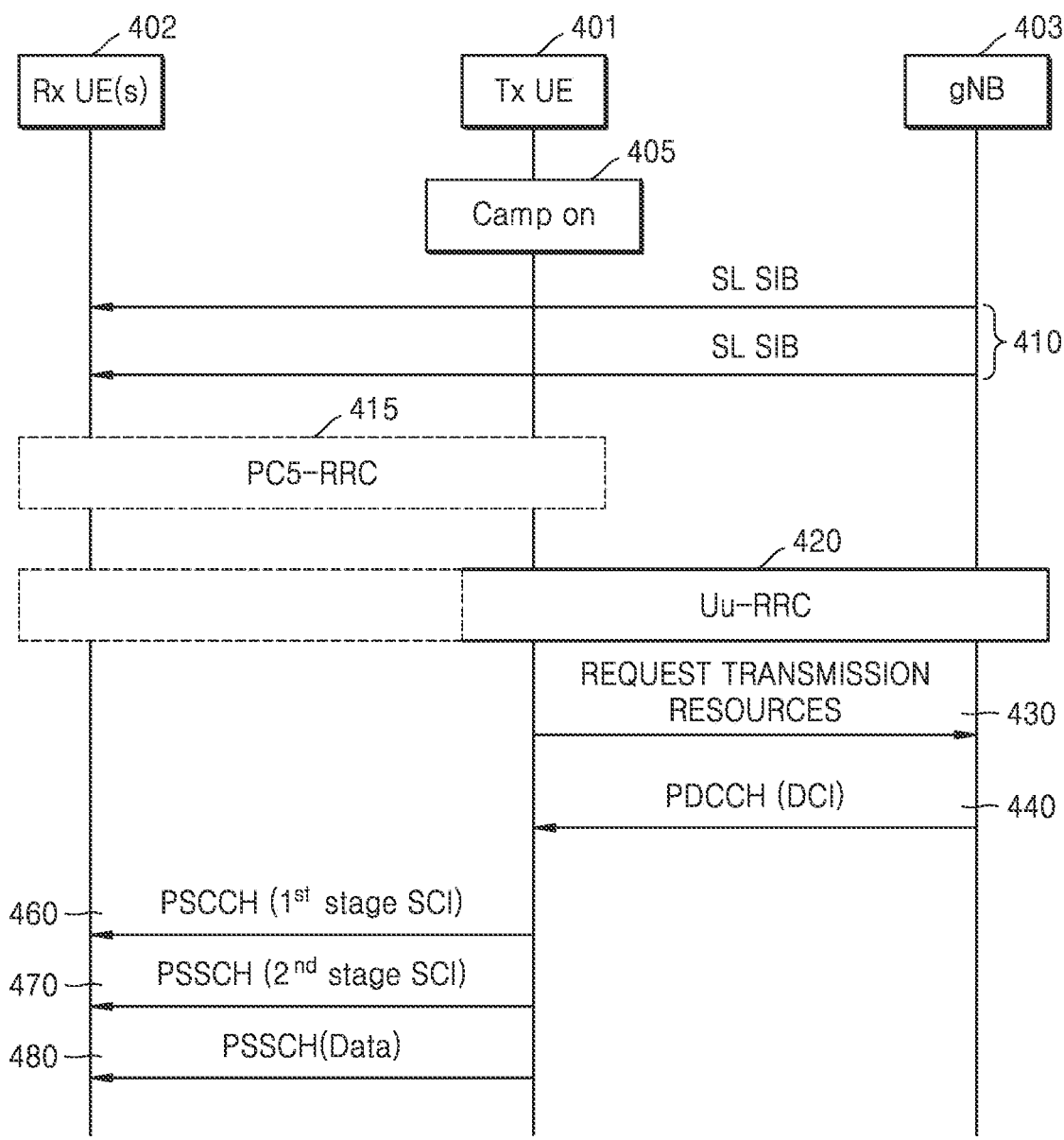
FIG. 4 is a diagram illustrating a method by which a base station allocates transmission resources in a sidelink, according to an embodiment of the disclosure.

FIG. 4 is a diagram illustrating a method by which a base station allocates transmission resources in a sidelink, according to an embodiment of the disclosure.

A method by which a base station allocates transmission resources in a sidelink may be referred to as Mode 1. Mode 1 may be scheduled resource allocation. Mode 1 may be a method by which the base station allocates resources used for sidelink transmission in a dedicated scheduling manner to UEs. Because the method of Mode 1 may allow the base station to manage sidelink resources, the method of Mode 1 may be effective in interference management and resource pool management.

Referring to FIG. 4, a transmission UE (e.g., Tx UE) 401 that is camped on and a reception UE (e.g., Rx UE) 402 may receive a sidelink system information block SL-SIB from a base station (e.g., gNB) 403. The reception UE 402 refers to a UE that receives data transmitted by the transmission UE 401. SL-SIB information may include sidelink resource pool information for sidelink transmission and reception, parameter configuration information for a sensing operation, information for configuring sidelink synchronization, or carrier information for sidelink transmission and reception operating at different frequencies.

When data traffic for V2X is generated in the transmission UE 401, the transmission UE 401 may be RRC-connected to the base station 403 (420). RRC connection between a UE and a base station may be referred to as Uu-RRC. The Uu-RRC connection process 420 may be performed before data traffic is generated in the transmission UE 401. Also, in Mode 1, in a state where the Uu-RRC connection process 420 is performed between the base station 403 and the reception UE 402, the transmission UE may perform transmission to the reception UE via a sidelink. On the other hand, in Mode 1, even in a state where the Uu-RRC connection process 420 is not performed between the base station 403 and the reception UE 402, the transmission UE may perform transmission to the reception UE via a sidelink.

The transmission UE 401 may request the base station for transmission resources for V2X transmission with the reception UE 402 (430). In this case, the transmission UE 401 may request the base station 403 for sidelink transmission resources by using a physical uplink control channel (PUCCH), an RRC message, or a media access control (MAC) control element (CE). The MAC CE may be a buffer status report (BSR) MAC CE of a new format (including at least an indicator indicating a BSR for V2X communication and information about a size of data buffered for D2D communication). Also, the transmission UE 401 may request sidelink resources through a scheduling request (SR) bit transmitted through the PUCCH.

Next, the base station 403 may allocate V2X transmission resources to the transmission UE 401. In this case, the base station may allocate transmission resources by using a dynamic grant or configured grant method.

First, in the dynamic grant method, the base station may allocate resources for TB transmission through downlink control information (DCI). Sidelink scheduling information included in the DCI may include parameters related to a transmission time point of initial transmission and retransmission and a frequency allocation position information field. DCI for the dynamic grant method may be CRC scrambled by an SL-V-RNTI to indicate that it is the dynamic grant method.

Next, in the configured grant method, the base station may periodically allocate resources for TB transmission by configuring a semi-persistent scheduling (SPS) interval through Uu-RRC. In this case, the base station may allocate resources for one TB through DCI. Sidelink scheduling information for one TB included in the DCI may include parameters related to a transmission time point of initial transmission and retransmission and frequency allocation position information. When resources are allocated by using the configured grant method, a transmission time point (occasion) of initial transmission and retransmission of one TB and a frequency allocation position may be determined by the DCI, and resources for a next TB may be repeated at an SPS interval. DCI for the configured grant method may be CRC scrambled by an SL-SPS-V-RNTI to indicate that it is the configured grant method. Also, the configured grant (CG) method may be divided into Type1 CG and Type2 CG. In the case of Type2 CG, resources configured by configured grant through DCI may be activated/deactivated.

Accordingly, in Mode 1, the base station 403 may instruct the transmission UE 401 to schedule sidelink communication with the reception UE 402 through DCI transmission through a PDCCH (440).

In broadcast transmission, the transmission UE 401 may broadcast SCI (1st stage) to the reception UE 402 through a PSCCH in broadcast without RRC configuration (415) for a sidelink (460). Also, the transmission UE 401 may broadcast data to the reception UE 402 through a PSSCH (480). In broadcast transmission, SCI transmission (2nd stage SCI) 470 through the PSSCH may not be performed.

In contrast, in unicast or groupcast transmission, the transmission UE 401 may perform RRC connection in a one-to-one manner with another UE. RRC connection between UEs may be referred to as PC5-RRC 415, distinguished from Uu-RRC. Even in groupcast, the PC5-RRC 415 may be individually connected between UEs in a group. Referring to FIG. 4, although connection of the PC5-RRC 415 is an operation after the transmission 410 of the SL-SIB, the connection of the PC5-RRC 415 may be performed any time before the transmission 410 of the SL-SIB or before the transmission of the SCI. When RRC connection between UEs is necessary, PC5-RRC connection of a sidelink may be performed, and the transmission UE 401 may transmit SCI (1st stage) to the reception UE 402 in unicast or groupcast through a PSCCH (460). In this case, groupcast transmission of the SCI may be interpreted as group SCI. Also, the transmission UE 401 may transmit SCI ($2^{nd}$ stage) to the reception UE 402 in unicast or groupcast through a PSSCH (470). In this case, the 1st stage SCI may include information related to resource allocation and the $2^{nd}$ stage SCI may include other control information. Also, the transmission UE 401 may transmit data to the reception UE 402 in unicast or groupcast through the PSSCH (480).

Figure 5:
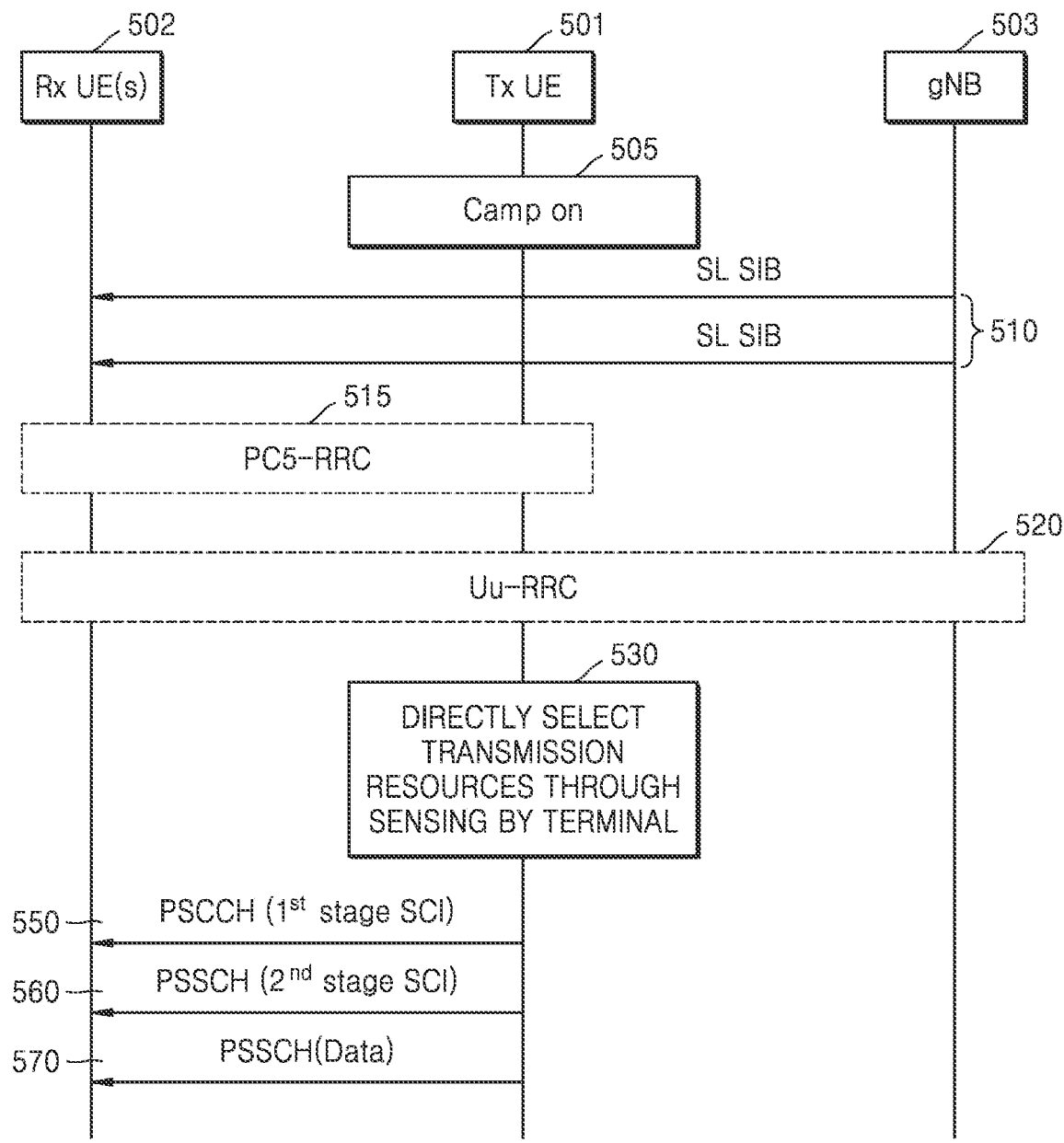
FIG. 5 is a diagram illustrating a method by which a user equipment (UE) directly allocates sidelink transmission resources through sensing in a sidelink, according to an embodiment of the disclosure.

FIG. 5 is a diagram illustrating a method by which a UE directly allocates sidelink transmission resources through sensing in a sidelink, according to an embodiment of the disclosure.

A method by which a UE directly allocates transmission resources of a sidelink through sensing may be referred to as Mode 2. Mode 2 may also be referred to as UE autonomous resource selection. In Mode 2, a base station 503 may provide a sidelink transmission and reception resource pool for V2X as system information, and a transmission UE 501 may select transmission resources according to a determined rule. Unlike in Mode 1 in which the base station is directly involved in resource allocation, in Mode 2 of FIG. 5, the transmission UE 501 autonomously selects resources and transmits data based on a resource pool previously received through system information.

Referring to FIG. 5, the transmission UE 501 that is camped on (505) and a reception UE 502 may receive an SL-SIB from the base station 503 (510). The reception UE 502 refers to a UE that receives data transmitted by the transmission UE 501. SL-SIB information may include sidelink resource pool information for sidelink transmission and reception, parameter configuration information for a sensing operation, information for configuring sidelink synchronization, or carrier information for sidelink transmission and reception operating at different frequencies.

FIGS. 4 and 5 are different in that in FIG. 4, the base station 503 and the UE 501 operate in an RRC connected state, whereas in FIG. 5, the UE 501 may operate in an idle mode (520) (in a state where RRC is not connected). Also, even in the RRC connected state (520), the base station 503 may not directly participate in resource allocation, and the transmission UE 501 may autonomously select transmission resources. RRC connection between the UE 501 and the base station 503 may be referred to as Uu-RRC 520. When data traffic for V2X is generated in the transmission UE 501, the transmission UE 501 may be configured with a resource pool through system information received from the base station 503, and the transmission UE 501 may directly select resources of a time/frequency domain through sensing in the resource pool (530).

In broadcast transmission, the transmission UE 501 may broadcast SCI (Pt stage) to the reception UE 502 through a PSCCH in broadcast without RRC configuration (520) for a sidelink (550). Also, the transmission UE 501 may broadcast data to the reception UE 502 through a PSSCH (560). In broadcast transmission, SCI transmission (2nd stage SCI) 470 through the PSSCH may not be performed.

In contrast, in unicast and groupcast transmission, the transmission UE 501 may perform RRC connection in a one-to-one manner with other UEs. RRC connection between UEs may be referred to as PC5-RRC, distinguished from Uu-RRC. Even in groupcast, PC5-RRC may be individually connected between UEs in a group. Although connection of PC5-RRC 515 is an operation after the transmission 510 of the SL-SIB in FIG. 5, the connection of PC5-RRC 515 may be performed any time before the transmission 510 of the SL-SIB or before the transmission 550 of the SCI. When RRC connection between UEs is necessary, PC5-RRC connection of a sidelink may be performed (515), and the transmission UE 501 may transmit SCI (1st stage) to the reception UE 502 in unicast or groupcast through a PSCCH (550). In this case, groupcast transmission of the SCI may be interpreted as group SCI. Also, the transmission UE 501 may transmit SCI (2nd stage) to the reception UE 502 in unicast or groupcast through a PSSCH (560). In this case, the $1^{st}$ stage SCI may include information related to resource allocation, and the $2^{nd}$ stage SCI may include other control information. Also, the transmission UE 501 may transmit data to the reception UE 502 in unicast or groupcast through the PSSCH (570).

Figure 6:
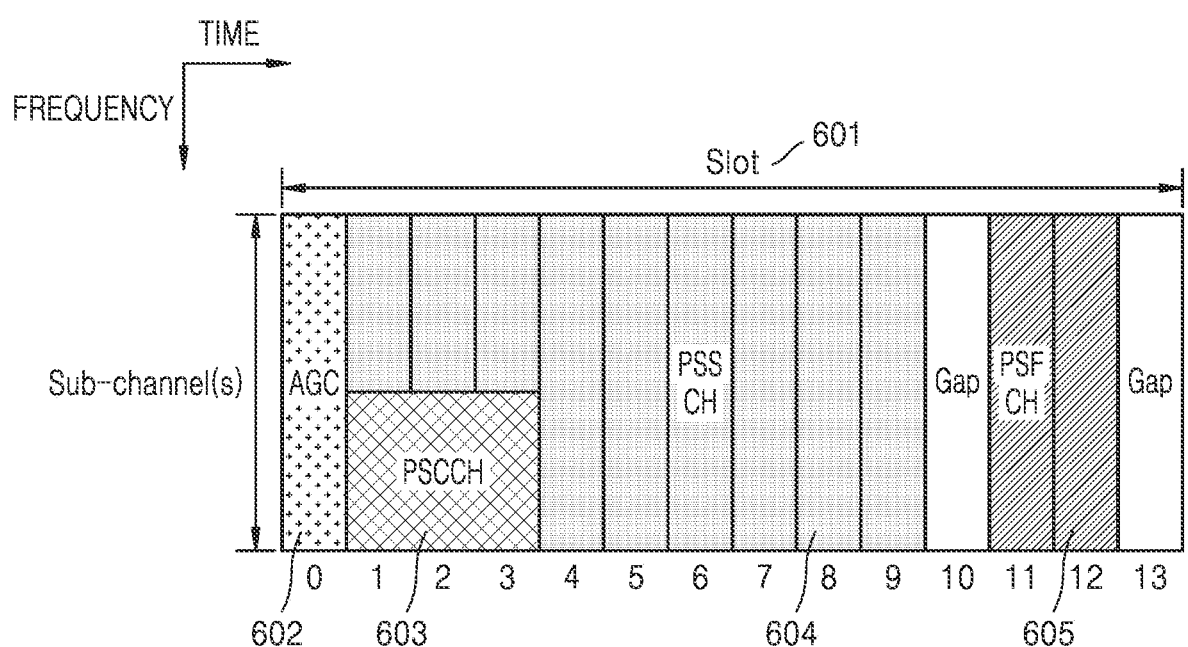
FIG. 6 is a diagram illustrating a mapping structure of physical channels mapped to one slot in a sidelink, according to an embodiment of the disclosure.

FIG. 6 is a diagram illustrating a mapping structure of physical channels mapped to one slot in a sidelink, according to an embodiment of the disclosure.

In detail, FIG. 6 illustrates mapping of PSCCH/PSSCH/PSFCH physical channels. PSCCH/PSSCH/PSFCH may be allocated to one or more sub-channels in frequency domain. A detailed description of sub-channel allocation has been made with reference to FIG. 3. Next, referring to FIG. 6 to describe mapping of PSCCH/PSSCH/PSFCH in time, one or more symbols before a transmission UE transmits PSCCH/PSSCH/PSFCH in a slot 601 may be used as a region 602 for automatic gain control (AGC). When the symbols are used for AGC, a method of repeatedly transmitting a signal of another channel in the symbol region may be considered. In this case, as the repeatedly transmitted signal of another channel, a part of a PSCCH symbol or a PSSCH symbol may be considered. On the other hand, a preamble may be transmitted in the AGC region. When a preamble signal is transmitted, there is an advantage in that an AGC execution time is shorter than a method of repeatedly transmitting a signal of another channel When a preamble signal is transmitted for AGC, a specific sequence may be used as the preamble signal, and in this case, a sequence such as PSSCH DMRS, PSCCH DMRS, or CSI-RS may be used as a preamble. A sequence used as a preamble is not limited to the above example.

In addition, referring to FIG. 6, a PSCCH 603 including control information may be transmitted in initial symbols of a slot, and data scheduled by the control information of the PSCCH 603 may be transmitted to a PSSCH 604. A part ($1^{st}$ stage SCI) of sidelink control information (SCI) that is control information may be mapped to the PSCCH 603 and may be transmitted. Not only data information but also another part ($2^{nd}$ stage SCI) of SCI that is control information may be mapped to the PSSCH 604 and may be transmitted. Also, FIG. 6 illustrates that a physical sidelink feedback channel (PSFCH) 605 that is a physical channel for transmitting feedback information is located at the end of the slot. In an embodiment, a certain empty time (Gap) may be secured between the PSSCH 604 and the PSFCH 605, so that the UE transmitting and receiving the PSSCH 604 prepares to transmit or receive the PSFCH 605. Also, a certain empty time (Gap) may be secured after the PSFCH 605 is transmitted and received.

FIG. 7 is a diagram for defining a sensing window and a resource selection window required for a UE to perform resource (re-)selection and re-evaluation in Mode 2, according to an embodiment of the disclosure.

In detail, in (a) of FIG. 7, triggering for resource (re-)selection is performed at a time point n, and triggering for re-evaluation is performed at n' (n'>n) through continuous sensing even after the (re-)selection triggering time point n.

Referring (a) of FIG. 7, it may be assumed that triggering for resource (re-) selection is performed at the time point n. A condition for triggering for resource (re-) selection may correspond to a case where one of the following conditions is satisfied.

When there is no Configured sidelink grant, or

When the configured sidelink grant is unable to provide a resource allocation space for radio link control (RLC) service data unit (SDU) transmission although an RLC SDU is scheduled to be transmitted without segmentation, or When the current configured sidelink grant does not satisfy a latency requirement for data in a logical channel, or When a resource pool is configured, or reconfigured by RRC, or When pre-emption is enabled in the resource pool and some of reserved resources are released In the case of the pre-emption, whether pre-emption is enabled/disabled may be (pre-)configured in the resource pool. An operation by which the UE preempts resources when the pre-emption is enabled in the resource pool may be an operation by which the UE releases some of the reserved resources after the resources are reserved through sensing and resource selection. In detail, referring to (b) of FIG. 7, when resources reserved by another UE through $1^{st}$ SCI decoding overlap some of the resources reserved by the UE as denoted by reference numeral 711, a priority of another UE is higher than a priority of the UE which is the transmission UE, and SL-reference signal received power (RSRP) of the overlapping resources is higher than a relevant SL-RSRP threshold, the UE may release the overlapping resources 711 for the already reserved resources. The UE may report information of the released resources to a higher layer of the UE. In this case, resource re-selection may be triggered and new resources 712 may be reselected. In this case, the priority of the transmission UE may be information indicated by the SCI. The pre-emption may be applied only to overlapping resources. A resource re-selection procedure may be performed according to the following Resource (re-)selection procedure. For a more detailed description, refer to the following Condition for performing pre-emption.

When the resource (re-)selection triggering time point is earlier than a time point n, and a re-evaluation condition is satisfied at a time point n' (n'>n) before reservation of selected resources is signaled through the SCI after the resources are selected, the UE may report resource information to be (re-)selected to a higher layer of the UE. Triggering for resource (re-)selection may be generated again. For a more detailed description, refer to the following Method of supporting re-evaluation triggering operation, Time point at which UE triggers re-evaluation of selected resources, and Re-evaluation triggering condition.

When triggering for resource (re-)selection is performed at the time point n, the sensing window may be determined as $(n-T_0, n-T_{proc,0})$. $T_0$ is a start time point of the sensing window, and may be (pre-)configured as resource pool information. A value of $T_0$ that may be (pre-)configured may be X=100 ms or Y=1000+X ms. On the other hand, in an embodiment, Y=1000 ms. The disclosure does not limit X and Y configured as $T_0$ to specific values. For example, X may be $T_0$ that may be considered when periodic resource reservation is not performed (see Method 1 in the following Mode 2 resource reservation method), and Y may be $T_0$ considered when periodic resource reservation is performed (see Method 2 in the following Mode 2 resource reservation method). Here, X may be a value determined by a time range W of allocated resources that may be indicated by the SCI. The disclosure may not limit a value of X to X=100 ms. X may be configured as another value. On the other hand, in an embodiment, X may be $T_0$ supported when a reservation interval is configured to be equal to or less than 100 ms, and Y may be $T_0$ supported when a reservation interval is configured to be greater than 100 ms. For example, when the reservation interval is configured as 1000 ms, To may limit the configuration of X=100 ms. This is because, when the reservation interval is configured to be greater than 100 ms and $T_0$ is configured as X=100 ms, a signal transmitted with a period greater than 100 ms may not be sensed. Also, $T_{proc,0}$ may be defined as a time required to process a sensing result, and $T_{proc,0}$ may vary according to configured $T_0$. In detail, when long $T_0$ is configured, long $T_{proc,0}$ may be required. In contrast, when short $T_0$ is configured, short $T_{proc,0}$ may be required. Accordingly, in an embodiment, $T_{proc,0}$ may be fixed to one value, but another value adjusted by configured $T_0$ may be (pre-)configured as resource pool information. For example, when $T_0$ is configured as X=100 ms, $T_{proc,0}$=0.1 ms. When $T_0$ is configured as Y=1000+X ms, $T_{proc,0}$=1 ms. Unlike this, $T_{proc,0}$=1 ms may be fixed regardless of configured $T_0$. On the other hand, because various subcarrier spacings (SCS s) are supported in an NR sidelink, a method of determining $T_{proc,0}$ according to the SCS may be considered. In detail, a method by which when the SCS is configured as {15, 30} kHz, $T_{proc,0}$ may be defined as 1 slot, and when the SCS is configured as {60, 120} kHz, $T_{proc,0}$ is (pre-)configured as one of {1, 2} slots may be considered. Unlike this, a method by which when the SCS is configured as {15, 30, 60} kHz, $T_{proc,0}$ is defined as 1 slot, and when the SCS is configured as {120} kHz, $T_{proc,0}$ is (pre-)configured as one of {1, 2} slots may be considered. The reason why the configuration of 1 slot is possible even when the high SCS is used is that $T_0$ is configured as X=100 ms and short $T_{proc,0}$ may be processed even in the high SCS. For example, the sensing window may be defined by $T_0$ and $T_{proc,0}$ as follows. Hereinafter, To is one of values of X and Y and may be a (pre-)configured value. Also, $T_{proc,0}$ may be a value configured through the higher layer signaling according to the SCS as described above. Also $(t_0^{SL}, t_1^{SL}, \ldots, t_{T_{max}}^{SL})$ may be defined as a set of slots belonging to the sidelink resource pool. According to definition of Table 1, the sensing window may be a configured interval obtained by converting $T_0$ (ms) configured before the slot n into a logical slot belonging to the resource pool.

TABLE 1

The UE shall monitor slots $t_{n'-T_0}^{SL}, t_{n'-T_0+1}^{SL}, \ldots, t_{n'-T_{proc,0}}^{SL}$ except for those in which its transmission occur, where $t_{n'}^{SL} = n$ if slot n belongs to the set $(t_0^{SL}, t_1^{SL}, \ldots, t_{T_{max}}^{SL})$, otherwise slot $t_{n'}^{SL}$ is the first slot after slot n belonging to the set $(t_0^{SL}, t_1^{SL}, \ldots, t_{T_{max}}^{SL})$ where $T_0$ is defined above and $T_{proc,0}$ is from higher layer parameter t0_processing.

Next, when triggering for resource (re-)selection is performed at the time point n, the resource selection window may be determined as $(n+T_1, n+T_2)$. $T_1$ may be selected by UE implementation for $T_1 \leq T_{proc,1}$. $T_{proc,1}$ is a maximum reference value considering a processing time required to select resources, and the processing time may vary according to UE implementation. For example, values of Alt 1 through Alt 6 shown in Table 2 may be used as a value of $T_{proc,1}$ according to SCS. That is, Table 2 shows $T_{proc,1}$ configured in units of slots.

TABLE 2

| μ | Alt 1 | Alt 2 | Alt 3 | Alt 4 | Alt 5 | Alt 6 |
| --- | --- | --- | --- | --- | --- | --- |
| 0 | 4 | 4 | 2 | 2 | 2 | 3 |
| 1 | 8 | 4 | 4 | 4 | 4 | 3 |
| 2 | 16 | 6 | 8 | 6 | 6 | 4 |
| 3 | 32 | 8 | 16 | 8 | 8 | 5 |

In Table 2, Alt 1 may correspond to a case where $T_{proc,1}$ is fixed to 4 ms and Alt 3 may correspond to a case where $T_{proc,1}$ is fixed to 2 ms. The remaining cases are examples where $T_{proc,1}$ is differently configured in units of slots. Accordingly, a value equal to or less than $T_{proc,1}$ may be selected as $T_1$ by UE implementation. Also, when it is assumed that Nmax resources may be selected for one TB, initial transmission and retransmission resources may be included in the Nmax resources. In this case, the UE may select $T_2$ within a range that satisfies $T_2 \leq$ Remaining packet delay budget (PDB). The UE may select $T_2$ within a range that satisfies $T_2 \geq T_{2min}$. When $T_{2\ min} >$ Remaining PDB, $T_{2\ min}$ = Remaining PDB. $T_{2\ min}$ is to prevent the UE from selecting $T_2$ that is a too small value. $T_{2\ min}$ may be defined as a function of a priority of the transmission UE. The priority of the transmission UE may be information indicated by the SCI. Also, 'T$_{2\ min}$ (priority)' that is T$_{2\ min}$ according to the priority may be configured in the higher layer. For example, T$_{2\ min}$ may be selected from the following set. T$_{2\ min}$ set={1, 5, 10, 20}*2$^\mu$. μ is an index corresponding to numerology and may be configured as the following values according to subcarrier spacing (SCS).

SCS=15 kHz, μ=0
SCS=30 kHz, μ=1
SCS=60 kHz, μ=2
SCS=120 kHz, μ=3

Next, a re-evaluation operation through continuous sensing even after triggering for resource (re-)selection is performed at the time point n may be considered. When triggering for resource (re-)selection is performed at a time point n and it is determined that selected resources are not suitable for transmission through continuous sensing after transmission resources are selected, triggering for changing the already selected resources at a time point n' (n'>n) may be defined as re-evaluation. An operation by which the UE triggers re-evaluation for the selected resources at the time point n' (n'>n) after the time point n at which triggering for resource (re-)selection is performed may be performed when the following condition is satisfied.

When the UE does not reserve resources selected through triggering for resource (re-)selection In this case, the reservation for resources may be interpreted as an operation of transmitting information about the selected resources through 1$^{st}$ SCI. Accordingly, the condition may be defined as a time point before the information about the selected resources is transmitted through the SCI. Also, the following methods may be considered as a method of supporting a re-evaluation triggering operation.

Method of Supporting Re-Evaluation Triggering Operation

Method 1: UE implementation
Method 2: default operation of the UE
122* Method 2: enabling/disabling of a resource pool may be (pre-) configured in the resource pool.

In detail, Method 1 may be a method of supporting whether to support triggering for re-evaluation of selected resources by the UE through UE implementation. Accordingly, whether to perform re-evaluation may vary according to the UE. Method 2 and Method 3 may be methods of specifying an operation by which the UE triggers re-evaluation of selected resources. Method 2 may be a method of specifying the necessary performance of the re-evaluation triggering operation, and Method 3 may be a method of (pre-)configuring enabling/disabling in the resource pool and allowing the re-evaluation triggering operation only in the enabled resource pool. Because whether to support triggering for re-evaluation may vary according to implementation when Method 1 is used, improvement of the performance of Mode 2 operation for avoiding collision of resource transmission may be limited. Accordingly, it may be assumed that Method 2 or Method 3 is used in the disclosure.

Referring to FIG. 7, for a slot m 701 that is a time point at which at least already selected resources are transmitted, the UE may perform triggering for re-evaluation only before a slot m–T$_3$. A change in the selected resources through re-evaluation may be limited to already selected resources at the time point m. T$_3$ may be a processing time required for re-selection. As a first method, a method of using the processing time T$_1$ for selecting resources already selected according to UE implementation as T$_3$ may be considered (T$_3$=T$_1$). However, an additional processing time for resource selection may be required in the re-evaluation process. In detail, not only a time for dropping previously selected resources but also a time required for, when the previous resources overlap new resources, processing the overlapping may be required. Accordingly, a method of configuring T$_3$=T$_{proc,1}$ may be considered. This is because T$_{proc,1}$ is a maximum reference value considering the processing time required to select resources and thus, when re-evaluation triggering is performed before the corresponding value, the change from the selected resources to other resources may be possible on the implementation. Unlike this, on the assumption that an additional processing time for resource selection according to resource re-evaluation such as a time of dropping previously selected resources and a time required for, when the previous resources overlap new resources, processing the overlapping is longer than T$_{proc,1}$, a method of configuring T$_3$=T$_{proc,1}$+X may be considered. A value of X may be defined as ms or defined in units of slots. For example, when X is defined in units of slots, X=1 slot. In the disclosure, X is not limited to the above example. Accordingly, the following method may be considered for a time point at which the UE triggers re-evaluation of selected resources.

Time Point at which UE Triggers Re-Evaluation of Selected Resources

Method 1: UE implementation
Method 2: the UE triggers re-evaluation in all slots n' (n'>n) before m-T$_3$.
Method 3: the UE triggers re-evaluation in one last slot n' corresponding to a slot before m-T$_3$.

In detail, Method 1 may be a method of supporting an operation by which the UE triggers re-evaluation of selected resources through UE implementation without specifying the operation. For example, Method 1 may be defined as follows. In Table 3, T$_3$ may be configured as T$_3$=T$_{proc,1}$+1 as described above. Also, m may be defined as a slot in which resources are selected through resource (re-)selection triggering at the time point n. According to the following definition, Method 1 may be selected by UE implementation from among time points that satisfy n'≤m–T$_3$.

TABLE 3

After resource (re-)selection is triggered in slot n by higher layer, the UE shall trigger resource re-evaluation in slot n' > n. The triggering moment n' for re-evaluation is up to UE implementation under n' ≤ m − T$_3$ where T$_3$ = T$_{proc,\ 1}$ + 1 slots and m is the corresponding slot that resource is selected by resource (re-)selection procedure.

Method 2 or Method 3 is a method of specifying an operation by which the UE triggers re-evaluation of selected resources. Method 2 is a method by which the UE triggers re-evaluation in all slots n' (n'>n) before m−$T_3$, and may generate multiple re-evaluations according to a length of n'−n. However, Method 3 is a method by which the UE triggers re-evaluation in one last slot n' corresponding to a slot before m−$T_3$, and thus may remove the disadvantage of Method 2 Because whether to support re-evaluation triggering may vary according to implementation when Method 1 is used, improvement of the performance of Mode 2 operation for avoiding collision of resource transmission may be limited. Accordingly, it may be assumed that Method 2 or Method 3 is used in the disclosure. As shown in FIG. 7, when triggering for re-evaluation is generated at n' (n'>n), the sensing window therefor may be determined as (n'−$T_0$, n'−$T_{proc,0}$) and the resource selection widow therefor may be determined as (n'+$T_1$, n'+$T_2$). In this case, To and $T_{proc,0}$ may have the same values as those used when triggering for (re-)selection is performed at the time point n. However, for $T_1$ and $T_2$, the UE may select the same values as those used when triggering for resource selection is performed at the time point n but may select other values by implementation Next, an operation by which the UE performs sensing in the above sensing window is described. First, sensing may be defined as an operation of performing sidelink control information (SCI) decoding for another UE and an operation of performing sidelink measurement. The operation of performing the SCI decoding for another UE may include an operation of successfully decoding the SCI and then obtaining SCI information of another UE. In this case, the SCI is information corresponding to $1^{st}$ SCI and may be obtained by detecting a PSCCH. The $1^{st}$ SCI may include the following information related to resource allocation.

Re-Evaluation Triggering Condition

Next, a condition in which the UE triggers re-evaluation may be defined as shown in Table 4. According to the following definition, for only first selected initial transmission resources (resources before reservation of selected resources is signaled through the SCI) after previous resource (re-)selection triggering is performed at the time point n and resources are selected, when RSRP of the corresponding resources is higher than an RSRP threshold configured in the current re-evaluation process, it is determined that the re-evaluation condition is satisfied and thus the re-evaluation may be triggered. In other words, triggering for resource (re-)selection may be generated again at the time point n' (n'>n).

When re-evaluation is triggered according to the condition of Table 4, the UE may report resource candidates selected by Resource (re-)selection procedure to the higher layer. Referring to FIG. 7, the sensing window and the resource selection window in this case may be determined based on the time point n' (n'>n). Also, in a detailed description of the 'only first selected initial transmission resources', the resources may correspond to initial transmission resources for one TB when Method 1 (dynamic reservation) is applied by referring to the following Mode 2 resource reservation method. When Method 2 (semi-persistent reservation) is applied, the resources may correspond to initial transmission resources for transmitting the first TB even when resources for a plurality of TBs are reserved.

Condition for Performing Pre-Emption

Next, a detailed example of a condition in which the UE performs pre-emption may be presented through Table 5. First, when pre-emption is enabled in the resource pool and all conditions a), b), and c) shown in <Table 5> are satisfied, the UE may trigger pre-emption, may release some of reserved resources, and may reselect the released resources. In Table 5, SCI format 0-1 may be $1^{st}$ stage SCI. According to Table 5, in the condition a), the UE may receive the $1^{st}$ stage SCI and may detect resource reservation information including priority information ($prio_{RX}$) of another UE and resource reservation period information ($P_{rsvp\_RX}$). In the condition b), an RSRP measurement value detected from the received 1st stage SCI may be higher than an RSRP threshold ($Th_{Pre}(prio_{RX})$). $Th_{Pre}(prio_{RX})$ is a value for determining pre-emption and may be configured as a value independent from the SL-RSRP threshold configured in the following Resource (re-)selection procedure. In detail, the SL RSRP threshold $Th_{a,b}$ may be configured as $Th_{priTX,priRX}$ according to a priority level. PriTX may be a priority of the transmission UE, and b may be a priority of another UE detected from the received $1^{st}$ stage SCI. Also, for a detailed description of RSRP measurement, refer to the following L1 SL RSRP measurement method. The condition c) may present a condition for a case where some of the resources reserved by the UE overlap resources reserved by another UE through $1^{st}$ stage SCI decoding.

TABLE 4 the RSRP measurement for a resource of the selected sidelink grant for the first new transmission opportunity from the previous (re-)selection procedure is higher than the RSRP threshold in the current re-evaluation procedure.

TABLE 5

If a resource pre-emption is enabled in resource pool, the UE shall trigger the pre-emption if it meets all the following conditions:
   a) the UE receives an SCI format 0-1 in slot $t_m^{SL}$, and "Resource reservation period" field, if present, and "Priority" field in the received SCI format 0-1 indicate the values $P_{rsvp\_RX}$ and $prio_{RX}$, respectively
   b) the RSRP measurement performed for the received SCI format 0-1, is higher than $Th_{Pre}\{prio_{RX}\}$;
   c) the SCI format received in slot $t_m^{SL}$ or the same SCI format which, if and only if the "Resource reservation period" field is present in the received SCI format 0-1, is assumed to be received in slot(s) $t_{m+P'_{rsvp\_RX}}^{SL}$ determines the set of resource blocks and slots which overlaps with a resource of the configured sidelink grant for transmission opportunity. Here, $P_{rsvp\_RX}'$ is $P_{rsvp\_RX}$ converted to units of logical slots.

When the condition of Table 5 is satisfied, pre-emption is triggered and some of the reserved resources are released and the released resources are reselected, a method of re-selecting resources may be performed according to the following Resource (re-)selection procedure.
Resource Allocation Information of 1$^{st}$ SCI
  Priority (QoS value)
  PSSCH resource assignment (frequency/time resource for PSSCH)
  Resource reservation period (if enabled)
    Refer to Method 2 of Mode 2 resource reservation method.
  PSSCH DMRS pattern (if more than one patterns are (pre-) configured)
    When more than one PSSCH DMRS patterns are (pre-) configured, the UE may select a PSSCH DRMS pattern and may indicate the PSSCH DMRS pattern through the SCI.
  Number of PSSCH DMRS port(s)

Sidelink measurement is to determine whether another UE occupies resources in time and frequency resources in which the transmission UE performs transmission, and to this end, the following measurement method may be considered in the sidelink.
L1 SL RSRP Measurement Method
  PSCCH reference signal received power (RSRP): measures average received power (in W) for DMRSs included in the PSCCH.
  PSSCH reference signal received power (RSRP): measures average received power (in W) for DMRSs included in the PSSCH.

In detail, the UE may measure PSCCH RSRP by monitoring a DMRS area of the PSCCH related to the 1$^{st}$ SCI. The UE may decode the 1$^{st}$ SCI, may detect PSSCH information connected thereto from the 1$^{st}$ SCI information, may monitor a PSSCH DMRS area, and may measure PSSCH RSRP. The PSCCH RSRP and the PSSCH RSRP may be named L1 SL RSRP. One of the PSCCH RSRP and the PSSCH RSRP may be (pre-)configured to be selected as L1 SL RSRP in the resource pool information.

Next, a resource (re-)selection procedure of the UE in the resource selection window is described. In detail, the procedure may be defined by the following two steps.
Resource (Re-)Selection Procedure
  Step 1: operation of identifying candidate resources for resource selection in the resource selection window
  Step 2: operation of selecting resources for transmission from the identified resource candidates
  First, Step 1 is an operation of discovering candidate resources for resource selection in the resource selection window. In this case, one resource candidate for PSSCH transmission in a resource selection window 702 may be defined as $R_{x,y}$ 703 as shown in FIG. 7. The resource pool in time and frequency domain used for sidelink transmission and reception has been described with reference to FIG. 3. $R_{x,y}$ 703 is one resource candidate including x+j consecutive sub-channels in a sub-channel area configured as the resource pool for a slot $t_y$ 704 belonging to the resource pool. j=0, ... $L_{subCH-1}$, and $L_{subCH}$ 705 is a sub-channel length for resource allocation and may be selected within a resource allocation range transmitted through system information. The number of all resource candidates in the resource selection window 702 may be defined as A. B (≤A) resource candidates for resource allocation may be left except for resource candidates determined to be inefficient for allocation of PSSCH transmission resources based on a sensing result in a sensing window 706. Here, B=A·X/100. In this case, X may be fixed to one value within a range of 0≤X≤100, and one of a plurality of values of X may be (pre-)configured in the resource pool. For example, X=20.

A detailed process of selecting the B candidates except for the resources determined to be inefficient for allocation of PSSCH transmission resources based on the sensing result in Step 1 is as follows.
  1. In the sensing window 706, monitoring is performed except for a slot in which actual transmission is performed.
  2. The L1 SL RSRP threshold $Th_{a,b}$ is configured as $Th_{priTX,PriRX}$ according to a defined priority level. PriTX is a priority of the transmission UE, and b is a priority of another UE detected from the received SCI.
  3. In the resource selection window 702, the total number of resource candidates $R_{x,y}$ 703 is configured as set $S_A$.
  4. When the following condition is satisfied, the UE excludes the corresponding resource candidates $R_{x,y}$ from $S_A$.
    A. In Process 1, there is a slot $t_z$ that is not monitored due to actual transmission. There are reserved resources connected to $t_z$ in the resource selection window by a configured resource reservation period (see Method 2 in Mode 2 resource reservation method), or
    B. Unicast or groupcast transmission is determined through SCI decoding, and there are resources reserved for the future by the received SCI.
      This is an operation of excluding resources reserved for unicast or groupcast from transmission resource selection candidates for future reception. For a detailed method, refer to Embodiment 1.
  5. When all of the following conditions are satisfied, the UE excludes the corresponding resource candidates $R_{x,y}$ from $S_A$.

A. The UE may obtain resource allocation information for another UE from the SCI received at $t_m$ in the sensing window 706 (see Resource allocation information of $1^{st}$ SCI), and B. L1 SL RSRP is measured (see the L1 SL RSRP measurement method) and the corresponding value is greater than the configured $Th_{priTX,PriRX}$, and C. There are resources reserved for $t_m$ in the resource selection window by the configured resource reservation period and there are resources expected to overlap $R_{x,y}$ 703 of $S_A$ in the future.

In this case, a detailed operation for Condition C may be described with reference to Table 6. In Table 6, SCI format 0-1 may refer to $1^{st}$ stage SCI. Also, $(t_0^{SL}, t_1^{SL}, \ldots, t_{T_{max}}^{SL})$ may be defined as a set of slots belonging to the sidelink resource pool. In Table 6, $P_{rsvp\_RX}$ may be values sequentially mapped to values of $P_{rsvp\_RX} \in \{0.1, 0.2, 0.3, 0.4, 0.5, 0.6, 0.7, 0.8, 0.9, 1, 2, 3, 4, 5, 6, 7, 8, 9, 10\}$ by $P \in \{1:99, 100, 200, 300, 400, 500, 600, 700, 800, 900, 1000\}$ ms, when a resource reservation period P is configured. Also, $T_{scal}$ may be a value obtained by converting the remaining packet delay budget (PDBs) in units of slots.

TABLE 6 the SCI format received in slot $t_m^{SL}$ the same SCI format which, if and only if the "Resource reservation period" field is present in the received format 0-1, is assumed to be received in slot(s)

$t_{m+q \times P'_{rsvp\_RX}}^{SL}$ determines the set of resource blocks and slots which overlaps with $R_{x,y+j \times P'_{rsvp\_TX}}$ for $q = 1, 2, \ldots, Q$ and $j = 0, 1, \ldots, C_{reset} - 1$. Here, $P_{rsvp\_RX}'$ is $P_{rsvp\_RX}$ converted to units of logical slots, $Q = \left\lceil \frac{T_{scal}}{P_{rsvp\_RX}} \right\rceil$ if $P_{rsvp\_RX} < T_{scal}$ and $n' - m \leq P_{rsvp\_Rx}'$, where $t_n^{SL} = n$ if slot n belongs to the set $(t_0^{SL}, t_1^{SL}, \ldots, t_{T_{max}}^{SL})$, otherwise slot $t_{n'}^{SL}$ is the first slot after slot n belonging to the set $(t_0^{SL}, t_1^{SL}, \ldots, t_{T_{max}}^{SL})$; otherwise $Q = 1$.

$T_{scal}$ is remaining packet delay budget (in slots).

6. When the number of resource candidates remaining in $S_A$ is less than B, $Th_{priTX,PriRX}$ is increased by 3 dB and Process 3 is repeated.

7. The process is repeated until the number of resource candidates $R_{x,y}$ 703 in $S_A$ is B.

When B candidates are selected through the process, a set of the resource candidates may be defined as $S_B$. The UE reports $S_B$ to the higher layer.

Next, Step 2 of (re-)selecting resources is an operation of determining transmission resources from $S_B$ which the UE reports to the higher layer in Step 1. The higher layer of the UE may randomly select transmission resources from among the resource candidates in $S_B$. Because resources are randomly selected in $S_B$, selection of the same resources between UEs may be avoided. A case where resource selection is performed only for one MAC protocol data unit (PDU) and a case where resource selection is performed for multiple MAC PDUs through reservation interval period configuration (see Method 2 of the following Mode 2 resource reservation method) is separately described. The MAC PDU may be a unit corresponding to one TB in a physical layer. The UE may select and reserve up to Nmax resources for one MAC PDU (see Method 1 of the following Mode 2 resource reservation method). That is, when Nmax is configured as 3, the UE may select up to 3 resources. Of course, when Nmax is configured as 3, the UE may select only one resource or only two resources.

A detailed process of Step 2 of (re-)selecting resources when resource selection is performed only for one MAC PDU is as follows.

1. The higher layer of the UE may randomly select transmission resources for one transmission opportunity from among resource candidates in $S_B$.

When the UE selects multiple (>1) resources, the operation may move to Detailed Process 1) or Detailed Process 2). Whether to enable/disable SL HARQ feedback may be configured through a sidelink radio bearer (SLRB).

When the HARQ feedback is disabled (when a retransmission method is blind retransmission), transmission opportunity(s) may be selected by Detailed Process 1).

1) One transmission opportunity may be selected in Process 1 from among resource candidates in $S_B$ reported to the higher layer of the UE, and transmission resources for another transmission opportunity may be randomly selected from among the remaining resource candidates. Process 1) may be repeated to additionally select the transmission opportunity according to the number of resources selected by the UE, Unlike this, when the HARQ feedback is enabled (when a retransmission method is HARQ feedback-based retransmission), transmission opportunity(s) may be selected by Detailed Process 2).

2) Transmission resources for another transmission opportunity may be selected by considering a period N of resources for transmitting and receiving a PSFCH in relation to the HARQ feedback, an offset value K between a slot for receiving a PSSCH and a slot for transmitting a PSFCH, and a preparation time for PSSCH retransmission (including a time during which HARQ ACK/NACK is received and decoded). Accordingly, the UE should maintain a minimum time gap considering the time for two selected resources. In detail, as shown in (c) of FIG. 7, when the HARQ feedback is enabled, the UE should select a transmission opportunity to maintain the time gap. Process 2) may be repeated to select an additional transmission opportunity according to the number of resources selected by the UE.

3) In the transmission opportunities selected in Process 1) or Process 2), a temporally first transmission opportunity may be used for initial transmission, and the following transmission opportunities may be sequential transmission resources for retransmission.

When the UE selects multiple (>1) resources, the condition in Table 7 should be satisfied.

In Table 7, it is required to select an interval between two resources selected for one TB by a range indicating a time gap between the two resources through the $1^{st}$ stage SCI. That is, a time range of allocated resources that may be indicated by the $1^{st}$ stage SCI may be W. W may be given as the number of logical slots belonging to the resource pool. For example, W may be 32 slots, and in this case, the condition in Table 7 should be satisfied for resource selection.

TABLE 7

For any two selected slot sets, when a set of slots $t_{n+j \times P'_{rsvp\_TX}}^{SL}$ for $j = 0, 1, \ldots, J - 1$ have been selected for a set of transmission opportunities of PSSCH, a set of slots TABLE 7-continued $t^{SL}_{n+k+j\times P'_{rsvp\_TX}}$ for $j = 0, 1, \ldots, J - 1$ for
another set of transmission opportunities of PSSCH shall
meet the conditions $-31 \le k \le 31$ and $k \ne 0$
where J is the maximum number of transmission opportunities
of PSSCH in a selected slot set.

Next, as described in 2), the condition in which the UE maintains the minimum time gap considering the time for two selected resources in order to select transmission resources for another transmission opportunity by considering the period N of resources for transmitting and receiving the PSFCH in relation to the HARQ feedback, the offset value K between the slot for receiving the PSSCH and the slot for transmitting the PSFCH, and the preparation time for PSSCH retransmission (including the time during which the HARQ ACK/NACK is received and decoded) may be defined as shown in Table 8. A condition in which PSFCH transmission is enabled in the resource pool may be handled equally to the condition in which the HARQ feedback is enabled. Also, MinTimeGapPSFCH may be a parameter corresponding to the offset value K between the slot for receiving the PSSCH and the slot for transmitting the PSFCH, and periodPSFCHresource may be a parameter corresponding to the period N of resources for transmitting and receiving the PSFCH.

TABLE 8

If PSFCH transmission in the resource pool is enabled, the UE shall ensure a minimum time gap k = a + b
between any two transmission opportunities of PSSCH where
a is a time gap between PSSCH transmission and corresponding PSFCH reception in slots determined
by high layer parameter of MinTimeGapPSFCH and periodPSFCHresource.
b is a PSFCH processing plus PSSCH retransmission preparation time in slots determined by UE
implementation.

2. The selected transmission opportunity(s) may be a selected sidelink grant.

When the selected sidelink grant is available, in other words, when transmission of the MAC PDU is possible, the operation may move to Process 3.

3. The UE may determine time and frequency locations at which the PSCCH and the PSSCH are transmitted by using the selected sidelink grant.

4. The selected sidelink grant may be a configured sidelink grant.

A method of (re-)selecting and reserving resources when resource selection is performed for one MAC PDU is described in more detail through Method 1 of the following Mode 2 resource reservation method.

Next, a detailed process of Step 2 of (re-)selecting resources when resource selection is performed for multiple MAC PDUs is as follows.

Transmission opportunity(s) selected through the application of the method of selecting resources for one MAC PDU may be the selected sidelink grant (see Process 2). In this case, a set of transmission opportunities for multiple MAC PDUs may be selected by the number of reservations configured with an interval indicated by the reservation interval period based on each of the transmission opportunity(s). Transmission opportunities of each set may be used for initial transmission and retransmission. The sets may be the selected sidelink grant. Also, in this case, Process 3 and Process 4 described above may be performed. A method of (re-)selecting and reserving resources when resource selection is performed for multiple MAC PDUs is described in more detail with reference to Method 2 of the following Mode 2 resource reservation method.

Next, an operation by which the UE reserves transmission resources after the resources are selected in the resource selection window based on the sensing result in the sensing window is described according to the above description. The following two methods may be used as a method by which the UE reserves transmission resources in the sidelink.

Mode 2 Resource Reservation Method

Method 1 (dynamic reservation): when a method by which resources are reserved by SCI related to another TB is not used, the transmission UE reserves N≤Nmax resources for one TB and transmits frequency-time resource allocation information to the reception UE through the $1^{st}$ SCI.

Method 2 (semi-persistent reservation): when a method by which resources are periodically reserved by SCI related to another TB is used, the transmission UE may successively reserve resources for multiple TBs after a time point corresponding to the reservation period (the resource reservation period P) indicated by higher layer signaling for the N≤Nmax resources reserved by Method 1. In this case, the transmission UE transmits information about the resource reservation period to the reception UE through the $1^{st}$ SCI.

Method 1 may be a method of dynamically reserving N≤Nmax resources for one TB.

Figure 8:
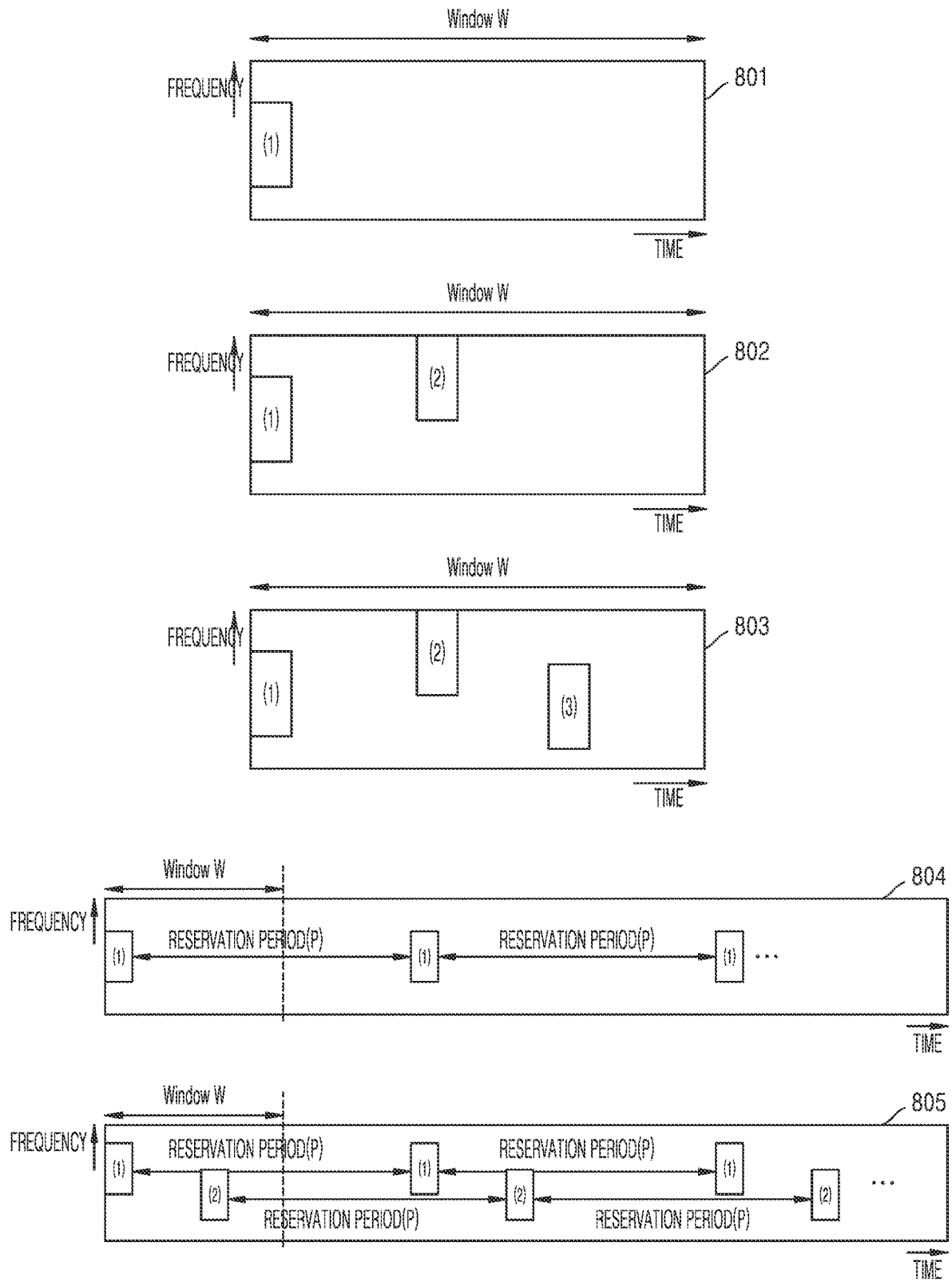
FIG. 8 is a diagram illustrating a method of reserving time-frequency resources, according to an embodiment of the disclosure.

FIG. 8 is a diagram illustrating a method of reserving time-frequency resources, according to an embodiment of the disclosure.

For example, FIG. 8 illustrates a method of reserving one time-frequency resource 801, two time-frequency resources 802, and three time-frequency resources 803 by using Method 1. $N_{max}$ may be a configured value, for example, 2 or 3. That is, when $N_{max}$ is configured as 3, up to three pieces of resource allocation information may be transmitted through SCI. Of course, when $N_{max}$ is configured as 3, only one piece of resource allocation information may be transmitted, only two pieces of resource allocation information may be transmitted, or three pieces of resource allocation information may be transmitted. A range of the frequency-time resources that may be allocated may be W. That is, a time range of allocated resources that may be indicated by the SCI may be W. W may be given as the number of slots. For example, W may be 32, which may mean that $N_{max}$ pieces of resource allocation information may be transmitted through the SCI in 32 slots. In Method 1, the number of sub-channels for N≤$N_{max}$ resources reserved by Method 1 may be constant, but the location of frequency resources for each resource may be different.

Next, Method 2 may be a method of periodically reserving resources for multiple TBs. The following may be considered as a value corresponding to the reservation period (the resource reservation period P). P∈ {0, 1:99, 100, 200, 300, 400, 500, 600, 700, 800, 900, 1000}ms. P=0 may indicate that Method 2 is not used. In other words, it may indirectly indicate that resources are not periodically reserved and Method 1 is used. In a method by which the transmission UE transmits the reservation period P to the reception UE through the $1^{st}$ SCI, a set for actually used reservation periods may be (pre-)configured in the resource pool, and the set equal to or smaller than 4 bits may be inserted into the $1^{st}$ SCI and transmitted. For example, when P∈{0, 100, 200, 300} is configured as the set, it may be indicated by using only SCI information of 2 bits. Accordingly, the total number of bits for the $1^{st}$ SCI indicated in the corresponding resource pool may vary according to the number of sets for the reservation period configured in the resource pool. Also, before the higher layer Cresel is configured as a counter and the counter becomes 0, the UE may not perform triggering for resource (re-) selection and re-evaluation, and resources may be transmitted by using the resources periodically reserved for the multiple TBs.

FIG. 8 also illustrates a method of semi-persistently reserving resources according to the reservation period P by using Method 2. According to 804, a method of selecting and reserving one resource by using Method 1 and periodically reserving resources according to the reservation period P by using Method 2 is illustrated. Also, according to 805, a method of selecting and reserving two resources by using Method 1 and periodically reserving resources according to the reservation period P by using Method 2 is illustrated. In Method 2, locations of frequency resources selected by Method 1 and the number of allocated sub-channels may have the constant reservation period P.

The following embodiment is to propose a procedure (Mode 2) by which the UE performs sensing and resource selection in the above sidelink. Also, the following embodiment proposes a Mode 2 method for minimizing power consumption of the UE. Also, the following embodiment relates to UE and base station operations according to the method.

Embodiment 1

Embodiment 1 proposes an operation by which the UE decodes SCI in Step 1 of the above Resource (re-)selection procedure in a process (Mode 2) of performing sensing and resource selection in the sidelink, and excludes resources reserved for unicast or groupcast from transmission resource selection candidates for the future reception. This method may be used when unicast or groupcast transmission from $1^{st}$ SCI or $2^{nd}$ SCI is distinguishable from broadcast transmission. In detail, the information may be indicated through SCI 1 bit and may be included in $1^{st}$ SCI or $2^{nd}$ SCI. Also, a method by which the information is joint encoded with another SCI information may be considered. The following two methods may be considered as an operation of excluding the resources reserved for unicast or groupcast from the transmission resource selection candidates for the future reception.

Method 1: When the UE decodes SCI, unicast or groupcast transmission is determined, and there are resources reserved for the future by the received SCI, the resource candidates $R_{x,y}$ are excluded from $S_A$ in Process 4 of Step 1 in Resource (re-)selection procedure.

Method 2: The UE decodes SCI, unicast or groupcast transmission is determined, and there are resources reserved for the future by the received SCI. In this case, only when RSRP of the resources is higher than a configured RSRP threshold, the resource candidates $R_{x,y}$ are excluded from $S_A$ in Process 4 of Step 1 in Resource (re-)selection procedure.

The RSRP threshold may be configured as a function of a priority, and may be (pre-)configured in the resource pool as a value independent from the RSRP threshold defined in Process 2 of Step 1 in Resource (re-)selection procedure.

Embodiment 2

Embodiment 2 proposes a method for minimizing power consumption of the UE in a process (Mode 2) by which the UE performs sensing and resource selection. There may be a case where the UE should minimize power consumption in the sidelink. In particular, for a pedestrian UE, a method and procedure of selecting transmission resources while minimizing power consumption of the UE is required. Accordingly, the sensing and resource selection method proposed by the disclosure may be limited to the pedestrian UE. However, the disclosure is not limited thereto. In other words, it should be noted that the disclosure may be applied to a general vehicle UE. First, random selection and partial sensing-based selection may be considered as a sensing and resource selection operation of Mode 2 for minimizing power consumption of the UE as described above.

First, the random selection is a method in which Step 1 of the above Resource (re-)selection procedure is not performed. The UE report A that is the number of all resource candidates in the resource selection window 702 to the higher layer and Step 2 in Resource (re-)selection procedure may be performed.

Next, the partial sensing-based selection is a method in which a sensing and resource selection operation in Step 1 of the above Resource (re-)selection procedure is minimized.

In a first method, the UE may monitor only a slot $t_{y'-k \times P_{step}}$ in the sensing window. Here, $t_{y'}=y$ corresponds to a case where a slot y belongs to $(t_0, t_1, \ldots, t_i, \ldots, t_{Tmax})$. When the slot y does not belong to $(t_0, t_1, \ldots, t_i, \ldots, t_{Tmax})$, $t_{y'}$ may be a first slot in which the slot y belongs to $(t_0, t_1, \ldots, t_i, \ldots, t_{Tmax})$. Also, $P_{step}$ may be a fixed or configurable value. For example, when $T_0$ is Y=1000+X ms, $P_{step}$=100. Alternatively, when $T_0$=100 ms, $P_{step}$=10. Here, k may be determined by a parameter gapCandidateSensing configured by higher layer, and gapCandidateSensing may be (pre-)configured in the resource pool. For example, when gapCandidateSensing=(1011011010), it may be a $k^{th}$ bit of gapCandidateSensing configured as 1. Also, the UE may select only Y slots from among slots belonging to the resource pool in the resource selection window by implementation. Y may be limited by a parameter configured by the higher layer. For example, Y may be determined by minNumCandidateSF, and minNumCandidateSF may be (pre-) configured in the resource pool. For example, when gminNumCandidateSF=5, Y selected by the UE should be greater than at least 5.

Figure 9:
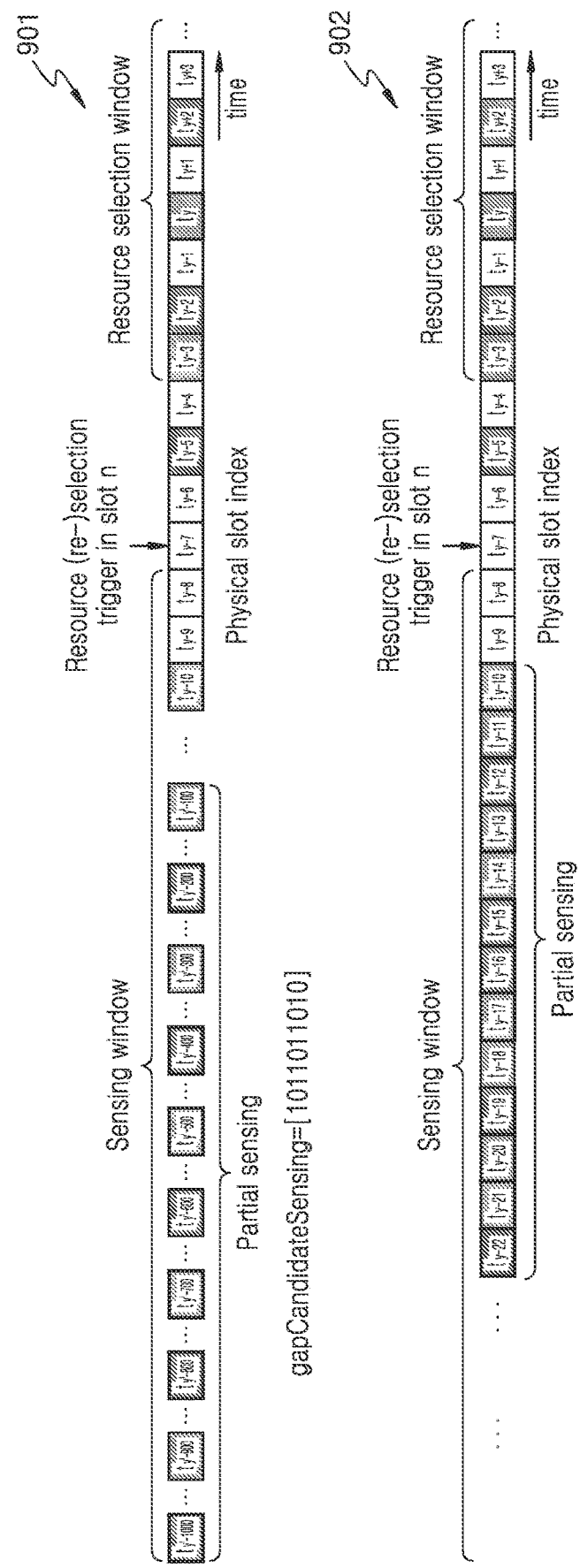
FIG. 9 is a diagram illustrating a detailed method of performing partial sensing-based selection, according to an embodiment of the disclosure.

FIG. 9 is a diagram illustrating a detailed method of performing partial sensing-based selection, according to an embodiment of the disclosure.

In 901 of FIG. 9, a method of performing the partial sensing-based selection is illustrated in detail.

In another method, a method of selecting Z latest slots in the sensing window as Z slots to be monitored from among slots belonging to the resource pool in the sensing window or randomly selecting Z slots in the sensing window may be considered. In this case, Z may be (pre-)configured as resource pool information. In 902 of FIG. 9, when Z=10, latest slots are selected in the sensing window.

The random selection and the partial sensing-based selection may be (pre-) configured in the resource pool as a sensing and resource selection operation of Mode 2 for minimizing power consumption of the UE. When beam management is performed in the sidelink, a sensing and resource selection operation of Mode 2 may be configured as the random selection. It may be assumed that, on the assumption that interference between UEs is minimized through beam management in the sidelink, transmission and reception between sidelink UEs may be efficiently performed even when resources are selected without a sensing procedure.

Embodiment 3

Embodiment 3 proposes a sensing and resource selection operation of Mode 2 for minimizing power consumption of the UE in the sidelink. At least one of the following methods may be considered as a method of minimizing the sensing and resource selection operation.
- simplify pre-emption execution
- simplify triggering for re-evaluation
- increase X used to identify candidate resources in Step 1 of Resource (re-)selection procedure
- exclude channel busy ratio (CBR) measurement
- exclude HARQ feedback (if enabled)
- exclude CQI feedback (if enabled)

From among the methods, a method of simplifying pre-emption execution, simplifying triggering for re-evaluation, and increasing X used to identify candidate resources in Step 1 of Resource (re-)selection procedure may be considered in the disclosure.

First, a method of applying pre-emption only to initial transmission resources when pre-emption execution is enabled and partial sensing-based selection is configured may be considered. When partial sensing is performed for all resources reserved by the UE, a lot of power may be consumed to perform pre-emption execution of the UE.

Next, it is assumed that Method 2 or Method 3 is used as described in Method of supporting re-evaluation triggering operation in the disclosure. A method of not performing re-evaluation triggering or applying re-evaluation triggering only to initial transmission resources when Method 2 (default operation of the UE) in Method of supporting re-evaluation triggering operation is used may be considered. According to an embodiment, an operation of not performing re-evaluation triggering may be interpreted as an operation of not performing re-evaluation triggering when partial sensing-based resource selection is performed. Alternatively, a method of applying re-evaluation triggering only to initial transmission resources when Method 3 (enabling/disabling is (pre-)configured in the resource pool) in Method of re-evaluation triggering operation is used may be considered. Because it is most important to successfully transmit initial transmission resources, performance improvement and power consumption reduction may be expected even when an operation of triggering re-evaluation is supported only for the resources.

Next, power consumption may be reduced by using a method of increasing X used to identify candidate resources in Step 1 of Resource (re-)selection procedure. For example, a process of discovering candidate resources when X=30 may be simpler than that when X=20. However, when X greatly increases, the probability of resource collision may increase.

Also, an operation of excluding HARQ feedback may be interpreted as an operation by which the TX UE disables (or deactivates) HARQ feedback during SCI transmission even when the HARQ feedback is enabled by higher layer configuration in order to minimize power consumption of the UE in the sidelink. In detail, an indicator for enabling/disabling (or activating/deactivating) HARQ feedback as 1 bit information may be included in SCI, and may be included in $2^{nd}$ stage SCI. When the TX UE indicates to enable (or activate) the HARQ feedback as 1 bit information in the SCI, the RX UE receiving the indicator for enabling the HARQ feedback of the TX UE may feed back information corresponding to ACK/NACK to the TX UE. However, when the HARQ feedback is indicated to be disabled (or deactivated), the RX UE may not additionally perform processing on the HARQ feedback, thereby reducing power consumption. A method identified in a PC5-RRC establishment procedure between UEs may be considered as a method by which the TX UE determines the RX UE as a UE whose power consumption should be reduced such as a pedestrian UE.

Also, an operation of excluding CSI feedback (or CQI feedback) may be interpreted as an operation by which the TX UE disables (or deactivates) CSI feedback during SCI transmission even when the CSI feedback is enabled by higher layer configuration in order to minimize power consumption of the UE in the sidelink. In detail, an indicator for enabling/disabling (activating/deactivating) CSI feedback may be included as 1 bit information in SCI, and may be included in $2^{nd}$ stage SCI. When the TX UE indicates to enable (or activate) the CSI feedback as 1 bit information in the SCI, the RX UE receiving the indicator for enabling the CSI feedback of the TX UE may feed back CQI and RI information corresponding to the CSI to the TX UE. However, when the CSI feedback is indicated to be disabled (or deactivated), the RX UE may not additionally perform processing on the CSI feedback, thereby reducing power consumption. A method identified in a PC5-RRC establishment procedure between UEs may be considered as a method by which the TX UE determines the RX UE as a UE whose power consumption should be reduced such as a pedestrian UE.

Embodiment 4

Embodiment 4 is another embodiment of partial sensing-based selection described in Embodiment 2. As described above, a partial sensing-based resource selection method may be considered as a sensing and resource selection operation of Mode 2 for minimizing power consumption of the UE in the sidelink. Because sensing is not performed in the case of random selection in a sensing and resource selection operation of Mode 2 as described above, system performance may be degraded when there is a UE that performs full sensing in the resource pool.

Figure 10:
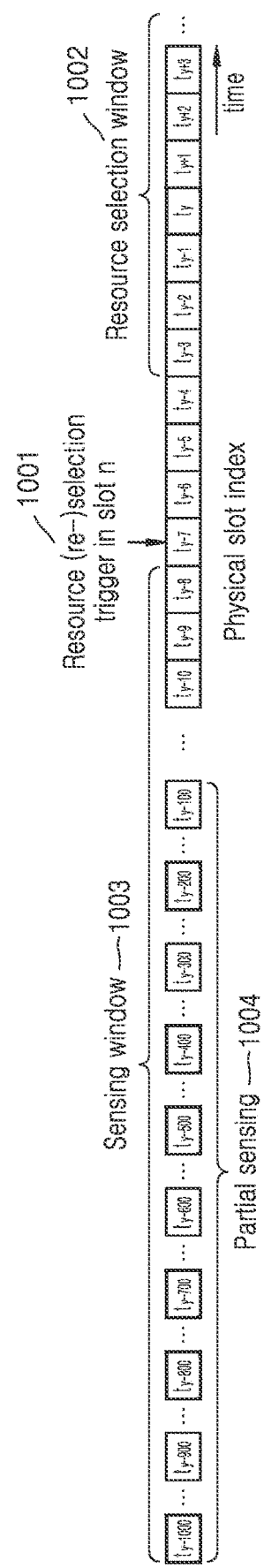
FIG. 10 is a diagram illustrating a detailed method of performing partial sensing-based resource selection, according to an embodiment of the disclosure.

FIG. 10 is a diagram illustrating a detailed method of performing partial sensing-based resource selection, according to an embodiment of the disclosure.

Referring to FIG. 10, when triggering for resource selection is performed in a slot n as shown in FIG. 10 in order to minimize a sensing and resource selection operation (1001), partial sensing-based resource selection may include a method of selecting only Y slots from among slots belonging to Y resource pools in a resource selection window 1002. Also, when it is assumed that a slot $t_y$ is a selected slot in the resource selection window 1002, only a slot $t_{y-k \times P_{step} \times 2^\mu}$ may be monitored in a sensing window 1003. Here, μ is an index corresponding to numerology, and may be configured as the following values according to subcarrier spacing (SCS).

SCS=15 kHz, µ=0
SCS=30 kHz, µ=1
SCS=60 kHz, µ=2
SCS=120 kHz, µ=3

Also, k may be determined by a parameter configured by the higher layer. For example, k may be (pre-)configured in the resource pool as gapCandidateSensing. $P_{step}$ is a fixed or configurable value, and may be an interval between slots for performing partial sensing. In an embodiment, $P_{step}$ may be a value in units of slots.

As described above, a position of a slot for performing monitoring in partial sensing-based resource selection may be a value determined by numerology. In detail, when SCS=15 k Hz and $T_0$ is configured as 1000 ms, a slot for performing monitoring in partial sensing-based resource selection may correspond to 1000 slots. However, when SCS=30 kHz and $T_0$ is configured as 1000 ms, a slot for performing monitoring in partial sensing-based resource selection may correspond to 2000 slots. Accordingly, when a position of a slot for performing monitoring in partial sensing-based resource selection is determined by an index corresponding to numerology as in $t_{y-k \times P_{step} \times 2^2}$ 1004, the same number of slots may be selected as partial monitoring slots. Alternatively, a position of a slot for performing monitoring in partial sensing-based resource selection may be determined as $t_{y-k \times P_{step}}$. The disclosure does not include such a method. However, when this method is used, the number of slots for performing monitoring may linearly increase as SCS increases. Although the number of slot candidates for performing monitoring in 15 KHz SCS is 10 in the above example, when a position of a slot for performing monitoring is determined as $t_{y-k \times P_{step}}$, the number of slot candidates in 30 kHz SCS may increase to 20. In this case, a bitmap size of gapCandidateSensing for indicating k may also increase. Also, this method has a disadvantage in that because monitoring slots increase as SCS increases, power consumption of the UE may increase. A more detailed method for parameter configuration is described.

First, Y may be determined by a parameter configured by the higher layer. For example, Y may be (pre-)configured in the resource pool as minNumCandidateSF. When a value of minNumCandidateSF is configured, the UE may configure Y as the value. Alternatively, Y may be determined as a value greater than minNumCandidateSF configured by UE implementation. Next, in the slot $t_{y-k \times Pstep \times 2^{\wedge}(\mu)}$ 1004 for performing monitoring through partial sensing in the sensing window 1003, $P_{step}$ may be a fixed or configurable value. For example, $P_{step}$ may be a value determined by $T_0$. In detail, when $T_0$ is configured as a value such as 1000 ms, $P_{step}$=100. Alternatively, when $T_0$ is configured as a value such as 100 ms, $P_{step}$=10. In the disclosure, $P_{step}$ is not limited to a specific value. Also, k may be determined by a parameter configured by the higher layer. For example, k may be (pre-)configured in the resource pool as gapCandidateSensing. For example, as shown in FIG. 10, when gapCandidateSensing=1011011010, a slot for performing sensing may be a slot corresponding to a $k^{th}$ bit of gapCandidateSensing configured as 1. That is, in FIG. 10, the UE may perform sensing in slots corresponding to $t_{y-1000}$, $t_{y-800}$, $t_{y-700}$, $t_{y-500}$, $t_{y-400}$, and $t_{y-200}$, based on (1011011010) bitmap information. However, bitmap information indicating a partial sensing slot of the UE is not limited to 10 bits, and bitmap information that is less than 10 bits or equal to or greater than 10 bits may be used to indicate a partial sensing slot of the UE.

Figure 11:
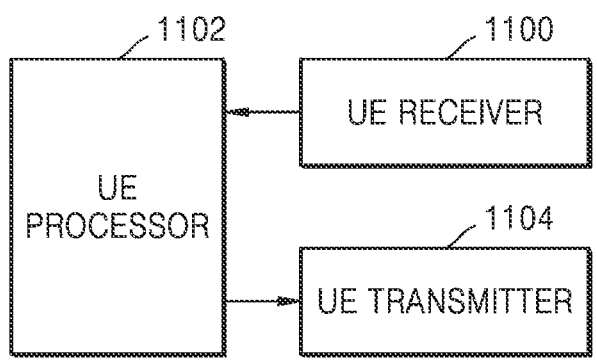
FIG. 11 is a block diagram illustrating an internal structure of a UE, according to an embodiment of the disclosure.
Figure 12:
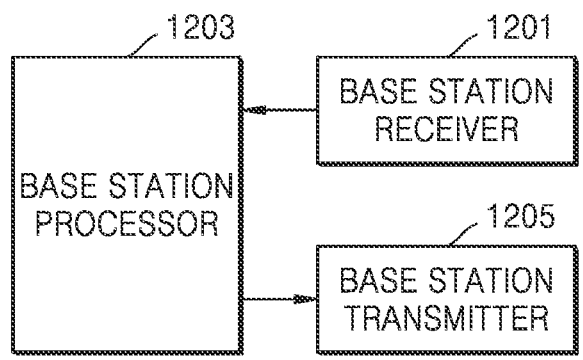
FIG. 12 is a block diagram illustrating an internal structure of a base station, according to an embodiment of the disclosure.

A transmitter, a receiver, and a processor of the UE and the base station to perform the above embodiments of the disclosure are illustrated in FIGS. 11 and 12. A method by which the UE performs sensing and resource selection in the sidelink is described in the embodiments, and in order to perform the method, the receiver, the processor, and the transmitter of the base station and the UE should operate according to an embodiment.

In detail, FIG. 11 is a block diagram illustrating an internal structure of a UE, according to an embodiment of the disclosure.

As shown in FIG. 11, a UE of the disclosure may include a UE receiver 1100, a UE transmitter 1104, and a UE processor 1102. However, the elements of the UE are not limited to those illustrated in FIG. 11. For example, the UE may include more or fewer elements than those illustrated in FIG. 11. In addition, the UE processor 1102, the UE receiver 1100, and the UE transmitter 1104 may be implemented as one chip.

The UE receiver 1100 and the UE transmitter 1104 may be collectively referred to as a transceiver in an embodiment of the disclosure. The transceiver may transmit and receive a signal to and from a base station. The signal may include control information and data. To this end, the transceiver may include a radio frequency (RF) transmitter that up-converts and amplifies a frequency of a transmitted signal, and an RF receiver that low-noise amplifies a received signal and down-converts a frequency. Also, the transceiver may receive a signal through a wireless channel and may output the signal to the UE processor 1102, and may transmit a signal output from the UE processor 1102 through the wireless channel.

The UE processor 1102 may control a series of processes in order for the UE to operate according to an embodiment of the disclosure. For example, the elements of the UE may be controlled so that the UE performs a sensing and resource selection method in sidelink communication according to an embodiment of the disclosure. In an embodiment, the UE processor 1102 may be referred to as a processor, at least one processor, or a controller.

FIG. 12 is a block diagram illustrating an internal structure of a base station, according to an embodiment of the disclosure.

As shown in FIG. 12, a base station of the disclosure may include a base station receiver 1201, a base station transmitter 1205, and a base station processor 1203. The base station receiver 1201 and the base station transmitter 1205 may be collectively referred to as a transceiver in an embodiment of the disclosure. However, the elements of the base station are not limited to those illustrated in FIG. 12. For example, the base station may include more or fewer elements than those illustrated in FIG. 12. In addition, the base station processor 1203, the base station receiver 1201, and the base station transmitter 1205 may be implemented as one chip.

The transceiver may transmit and receive a signal to and from a UE. The signal may include control information and data. To this end, the transceiver may include an RF transmitter that up-converts and amplifies a frequency of a transmitted signal, and an RF receiver that low-noise amplifies a received signal and down-converts a frequency. Also, the transceiver may receive a signal through a wireless channel and output the signal to the base station processor 1203, and may transmit a signal output from the base station processor 1203 through the wireless channel.

The base station processor 1203 may control a series of processes so that the base station operates according to an embodiment of the disclosure.

For example, the elements of the base station may be controlled so that the UE performs a sensing and resource selection method in sidelink communication according to an embodiment of the disclosure. In an embodiment, the base station processor 1203 may be referred to as a processor, at least one processor, or a controller.

According to an embodiment of the disclosure, an operating method of a terminal in a wireless communication system may include identifying a first candidate resource set for sidelink communication in a first resource selection window, through sensing based on first sidelink control information (SCI) received in a first sensing window, reporting the first candidate resource set to a higher layer of the terminal, so that the higher layer of the terminal selects a first resource in the first candidate resource set, identifying a second candidate resource set for sidelink communication in a second resource selection window, through sensing based on second SCI received in a second sensing window, determining whether to perform pre-emption or re-evaluation for the first resource, based on the second SCI, and when it is determined to perform the pre-emption or the re-evaluation for the first resource, triggering re-selection of resources for sidelink communication, and reporting the first resource for which the pre-emption or the re-evaluation has been performed, and the second candidate resource set to the higher layer of the terminal, so that the higher layer of the terminal performs re-selection of resources based on the first resource for which the pre-emption or the re-evaluation has been performed and the second candidate resource set.

According to an embodiment, the determining whether to perform the pre-emption or the re-evaluation for the first resource may include, when the pre-emption of the first resource is enabled, obtaining priority information and reservation period information of another terminal based on the second SCI, performing reference signal received power (RSRP) measurement based on the second SCI, and when measured RSRP is higher than an RSRP threshold determined based on the priority information of the other terminal and resources reserved by the other terminal overlap the first resource, triggering the pre-emption of the first resource.

According to an embodiment, the determining whether to perform the pre-emption or the re-evaluation for the first resource may include, when an RSRP measurement value for the first resource is higher than a pre-determined threshold, triggering the re-evaluation of the first resource.

According to an embodiment, when the re-selection of the resources is triggered at a time point n, the second sensing window may be determined in a range between $n-T_0$ and $n-T_{proc,0}$ in a time domain, wherein $T_0$ is a pre-determined value, and $T_{proc,0}$ is a value in units of slots determined based on subcarrier spacing (SCS).

According to an embodiment, when the re-selection of the resources is triggered at a time point n, the second resource selection window may be determined in a range between $n+T_1$ and $n+T_2$ in a time domain, wherein $T_1$ is determined to be equal to or less than $T_{proc}$, $T_{proc,1}$ is a value in units of slots determined based on subcarrier spacing (SCS), and $T_2$ is determined to be equal to or greater than a minimum value related to $T_2$ and equal to or less than a remaining packet delay budget (PDB).

According to an embodiment, the re-selection of the resources may be performed by the higher layer of the terminal, by selecting resource for sidelink communication in the second candidate resource set, except for the first resource for which the pre-emption or the re-evaluation has been performed.

According to an embodiment of the disclosure, a terminal in a wireless communication system includes a transceiver, and at least one processor configured to identify a first candidate resource set for sidelink communication in a first resource selection window, through sensing based on first sidelink control information (SCI) received in a first sensing window, report the first candidate resource set to a higher layer of the terminal, so that the higher layer of the terminal selects a first resource in the first candidate resource set, identify a second candidate resource set for sidelink communication in a second resource selectin window, through sensing based on second SCI received in a second sensing window, determine whether to perform pre-emption or re-evaluation for the first resource, based on the second SCI, and when it is determined to perform the pre-emption or the re-evaluation for the first resource, trigger re-selection of resources for sidelink communication, and report the first resource for which the pre-emption or the re-evaluation has been performed and the second candidate resource set to the higher layer of the terminal, so that the higher layer of the terminal performs re-selection of resources based on the first resource for which the pre-emption or the re-evaluation has been performed and the second candidate resource set.

According to an embodiment, the at least one processor may be further configured to, when the pre-emption of the first resource is enabled, obtain priority information and reservation period information of another terminal based on the second SCI, perform reference signal received power (RSRP) measurement based on the second SCI, and when measured RSRP is higher than an RSRP threshold determined based on the priority information of the other terminal and resources reserved by the other terminal overlap the first resource, trigger the pre-emption of the first resource.

According to an embodiment, the at least one processor may be further configured to, when an RSRP measurement value for the first resource is higher than a pre-determined threshold, trigger the re-evaluation of the first resource.

According to an embodiment, when the re-selection of the resources is triggered at a time point n, the second sensing window may be determined in a range between $n-T_0$ and $n-T_{proc,0}$ in a time domain, wherein $T_0$ is a pre-determined value, and $T_{proc,0}$ is a value in units of slots determined based on subcarrier spacing (SCS).

According to an embodiment, when the re-selection of the resources is triggered at a time point n, the second resource selection window may be determined in a range between $n+T_1$ and $n+T_2$ in a time domain, wherein $T_1$ is determined to be equal to or less than $T_{proc,1}$, $T_{proc,1}$ is a value in units of slots determined based on subcarrier spacing (SCS), and $T_2$ is determined to be equal to or greater than a minimum value related to $T_2$ and equal to or less than a remaining packet delay budget (PDB).

According to an embodiment, the re-selection of the resources may be performed by the higher layer of the terminal, by selecting resources for sidelink communication in the second candidate resource set, except for the first resource for which the pre-emption or the re-evaluation has been performed.

Methods according to the embodiments of the disclosure as described in the detailed description or in the following claims may be implemented as hardware, software, or a combination of hardware and software.

When the methods are implemented as software, a computer-readable storage medium or a computer program product storing one or more programs (software modules) may be provided. The one or more programs that are stored in the computer-readable storage medium or the computer program product are configured to be executable by one or more processors in an electronic device. The one or more programs include instructions for allowing the electronic device to execute the methods according to the claims or the embodiments of the disclosure.

The programs (e.g., software modules or software) may be stored in a non-volatile memory including a random-access memory (RAM) or a flash memory, a read-only memory (ROM), an electrically erasable programmable read-only memory (EEPROM), a magnetic disc storage device, a compact disc-ROM (CD-ROM), a digital versatile disc (DVD), another optical storage device, or a magnetic cassette. Alternatively, the programs may be stored in a memory including any combination of some or all of the above storage media. Also, a plurality of such constituent memories may be provided.

Also, the programs may be stored in an attachable storage device that is accessible through a communication network, such as the Internet, an intranet, a local area network (LAN), a wide LAN (WLAN), or a storage area network (SAN), or a combination thereof. Such a storage device may access, via an external port, the device for performing embodiments of the disclosure. Furthermore, an additional storage device on the communication network may access the device for performing embodiments of the disclosure.

In the disclosure, the term "computer program product" or "computer-readable recording medium" is used to totally indicate a memory, a hard disc mounted in a hard disk drive, and a medium such as a signal. The "computer program product" or "computer-readable medium" is a means provided to a method by which a UE senses and selects resources in sidelink communication according to the disclosure.

In the afore-described embodiments of the disclosure, elements included in the disclosure are expressed in a singular or plural form according to the embodiments of the disclosure. However, the singular or plural form is selected appropriately for a condition provided for convenience of explanation, and the disclosure is not limited to the singular or plural form. An element expressed in a singular form may include a plurality of elements and elements expressed in a plural form may include a single element.

Particular embodiments of the disclosure have been described in the detailed descriptions of the disclosure, but it will be understood that various modifications may be made without departing the scope of the disclosure. Hence, the scope of the disclosure is not limited to the above embodiments of the disclosure, and may be defined by not only the following claims but also equivalents thereof.

The invention claimed is:

1. An operating method of a terminal in a wireless communication system, the operating method comprising:
   identifying a first candidate resource set for sidelink communication in a first resource selection window, through sensing based on first sidelink control information (SCI) received in a first sensing window;
   reporting the first candidate resource set to a higher layer of the terminal, so that the higher layer of the terminal selects a first resource in the first candidate resource set;
   identifying a second candidate resource set for sidelink communication in a second resource selection window, through sensing based on second SCI received in a second sensing window;
   determining, based on the second candidate resource set, whether to perform pre-emption for the first resource, and in response to determining to perform the pre-emption for the first resource, triggering re-selection of resources for sidelink communication; and
   reporting the first resource determined for which the pre-emption is performed, and the second candidate resource set to the higher layer of the terminal, so that the higher layer of the terminal performs re-selection of the resources based on the first resource and the second candidate resource set.

2. The operating method of claim 1, wherein the determining of whether to perform the pre-emption for the first resource comprises:
   in response to the pre-emption of the first resource being enabled, obtaining priority information and reservation period information of another terminal based on the second SCI;
   performing reference signal received power (RSRP) measurement based on the second SCI; and
   in response to a value of the measured RSRP being higher than an RSRP threshold determined based on the priority information of the other terminal and resources reserved by the other terminal overlap the first resource, triggering the pre-emption of the first resource.

3. The operating method of claim 1,
   wherein, in response to the re-selection of the resources being triggered at a time point n, the second sensing window is determined in a range between $n-T_0$ and $n-T_{proc,0}$ in a time domain,
   wherein $T_0$ is a pre-determined value, and
   wherein $T_{proc,0}$ is a value in units of slots determined based on subcarrier spacing (SCS).

4. The operating method of claim 1,
   wherein, in response to the re-selection of the resources being triggered at a time point n, the second resource selection window is determined in a range between $n+T_1$ and $n+T_2$ in a time domain,
   wherein $T_1$ is determined to be equal to or less than $T_{proc}$, $T_{proc,1}$ is a value in units of slots determined based on subcarrier spacing (SCS), and
   wherein $T_2$ is determined to be equal to or greater than a minimum value related to $T_2$ and equal to or less than a remaining packet delay budget (PDB).

5. The operating method of claim 1, wherein the re-selection of the resources is performed by the higher layer of the terminal, by selecting resource for sidelink communication in the second candidate resource set, except for the first resource determined for which the pre-emption is performed.

6. A terminal in a wireless communication system, the terminal comprising:
   a transceiver; and
   at least one processor configured to:
      identify a first candidate resource set for sidelink communication in a first resource selection window, through sensing based on first sidelink control information (SCI) received in a first sensing window,
      report the first candidate resource set to a higher layer of the terminal, so that the higher layer of the terminal selects a first resource in the first candidate resource set,
      identify a second candidate resource set for sidelink communication in a second resource selectin window, through sensing based on second SCI received in a second sensing window, determine, based on the second candidate resource set, whether to perform pre-emption for the first resource, and in response to determining to perform the pre-emption for the first resource, trigger re-selection of resources for sidelink communication, and report the first resource determined for which the pre-emption is performed and the second candidate resource set to the higher layer of the terminal, so that the higher layer of the terminal performs re-selection of the resources based on the first resource and the second candidate resource set.

7. The terminal of claim 6, wherein the at least one processor is further configured to:
in response to the pre-emption of the first resource being enabled, obtain priority information and reservation period information of another terminal based on the second SCI;
perform reference signal received power (RSRP) measurement based on the second SCI; and
in response to a value of measured RSRP being higher than an RSRP threshold determined based on the priority information of the other terminal and resources reserved by the other terminal overlap the first resource, trigger the pre-emption of the first resource.

8. The terminal of claim 6,
wherein, in response to the re-selection of the resources being triggered at a time point n, the second sensing window is determined in a range between n−$T_0$ and n−$T_{proc,0}$ in a time domain,
wherein $T_0$ is a pre-determined value, and
wherein $T_{proc,0}$ is a value in units of slots determined based on subcarrier spacing (SCS).

9. The terminal of claim 6,
wherein, in response to the re-selection of the resources being triggered at a time point n, the second resource selection window is determined in a range between n+$T_1$ and n+$T_2$ in a time domain,
wherein $T_1$ is determined to be equal to or less than $T_{proc,1}$, $T_{proc,1}$ is a value in units of slots determined based on subcarrier spacing (SCS), and
wherein $T_2$ is determined to be equal to or greater than a minimum value related to $T_2$ and equal to or less than a remaining packet delay budget (PDB).

10. The terminal of claim 6, wherein the re-selection of the resources is performed by the higher layer of the terminal, by selecting the resources for sidelink communication in the second candidate resource set, except for the first resource determined for which the pre-emption is performed.

11. An operating method of a terminal in a wireless communication system, the operating method comprising:
identifying a first candidate resource set for sidelink communication in a first resource selection window, through sensing based on first sidelink control information (SCI) received in a first sensing window;
reporting the first candidate resource set to a higher layer of the terminal, so that the higher layer of the terminal selects a first resource in the first candidate resource set;
identifying a second candidate resource set for sidelink communication in a second resource selection window, through sensing based on second SCI received in a second sensing window;
determining, based on the second candidate resource set, whether to perform re-evaluation for the first resource, and in response to determining to perform the re-evaluation for the first resource, triggering re-selection of resources for sidelink communication; and
reporting the first resource determined for which the re-evaluation is performed, and the second candidate resource set to the higher layer of the terminal, so that the higher layer of the terminal performs re-selection of the resources based on the first resource and the second candidate resource set.

12. The operating method of claim 11,
wherein, in response to the re-selection of the resources being triggered at a time point n, the second sensing window is determined in a range between n−$T_0$ and n−$T_{proc,0}$ in a time domain,
wherein $T_0$ is a pre-determined value, and
wherein $T_{proc,0}$ is a value in units of slots determined based on subcarrier spacing (SCS).

13. The operating method of claim 11,
wherein, in response to the re-selection of the resources being triggered at a time point n, the second resource selection window is determined in a range between n+$T_1$ and n+$T_2$ in a time domain,
wherein $T_1$ is determined to be equal to or less than $T_{proc}$, $T_{proc,1}$ is a value in units of slots determined based on subcarrier spacing (SCS), and
wherein $T_2$ is determined to be equal to or greater than a minimum value related to $T_2$ and equal to or less than a remaining packet delay budget (PDB).

14. The operating method of claim 11, wherein the re-selection of the resources is performed by the higher layer of the terminal, by selecting resource for sidelink communication in the second candidate resource set, except for the first resource determined for which the re-evaluation is performed.

15. The operating method of claim 11, wherein the determining of whether to perform the re-evaluation for the first resource comprises:
in response to an RSRP measurement value for the first resource being higher than a pre-determined threshold, triggering the re-evaluation of the first resource.

16. A terminal in a wireless communication system, the terminal comprising:
a transceiver; and
at least one processor configured to:
identify a first candidate resource set for sidelink communication in a first resource selection window, through sensing based on first sidelink control information (SCI) received in a first sensing window,
report the first candidate resource set to a higher layer of the terminal, so that the higher layer of the terminal selects a first resource in the first candidate resource set,
identify a second candidate resource set for sidelink communication in a second resource selectin window, through sensing based on second SCI received in a second sensing window,
determine, based on the second candidate resource set, whether to perform re-evaluation for the first resource, and in response to determining to perform the re-evaluation for the first resource, trigger re-selection of resources for sidelink communication, and
report the first resource determined for which the re-evaluation is performed and the second candidate resource set to the higher layer of the terminal, so that the higher layer of the terminal performs re-selection of the resources based on the first resource and the second candidate resource set.

17. The terminal of claim 16,
wherein, in response to the re-selection of the resources being triggered at a time point n, the second sensing window is determined in a range between $n-T_0$ and $n-T_{proc,0}$ in a time domain,
wherein $T_0$ is a pre-determined value, and
wherein $T_{proc,0}$ is a value in units of slots determined based on subcarrier spacing (SCS).

18. The terminal of claim 16,
wherein, in response to the re-selection of the resources being triggered at a time point n, the second resource selection window is determined in a range between $n+T_1$ and $n+T_2$ in a time domain,
wherein $T_1$ is determined to be equal to or less than $T_{proc,1}$, $T_{proc,1}$ is a value in units of slots determined based on subcarrier spacing (SCS), and
wherein $T_2$ is determined to be equal to or greater than a minimum value related to $T_2$ and equal to or less than a remaining packet delay budget (PDB).

19. The terminal of claim 16, wherein the re-selection of the resources is performed by the higher layer of the terminal, by selecting the resources for sidelink communication in the second candidate resource set, except for the first resource determined for which the re-evaluation is performed.

20. The terminal of claim 16, wherein the at least one processor is further configured to:
in response to an RSRP measurement value for the first resource being higher than a pre-determined threshold, trigger the re-evaluation of the first resource.

* * * * *